US012806580B2

(12) United States Patent
Gaytan Perez et al.

(10) Patent No.: US 12,806,580 B2
(45) Date of Patent: Nov. 24, 2026

(54) APPARATUS AND METHOD FOR DISSOLVING POWDERS IN SOLVENTS

(71) Applicant: DSM IP Assets B.V., Heerlen (NL)

(72) Inventors: Ivan de Jesus Gaytan Perez, Kaiseraugst (CH); Stewart Terrence Mitchard, Melksham (GB); Adam Smith, Kaiseraugst (CH)

(73) Assignee: DSM IP ASSETS B.V., Maastricht (NL)

( * ) Notice: Subject to any disclaimer, the term of this patent is extended or adjusted under 35 U.S.C. 154(b) by 501 days.

(21) Appl. No.: 18/257,201

(22) PCT Filed: Dec. 17, 2021

(86) PCT No.: PCT/EP2021/086626
§ 371 (c)(1),
(2) Date: Jun. 13, 2023

(87) PCT Pub. No.: WO2022/129593
PCT Pub. Date: Jun. 23, 2022

(65) Prior Publication Data

US 2024/0042397 A1 Feb. 8, 2024

(30) Foreign Application Priority Data

Dec. 17, 2020 (EP) .................................... 20215191

(51) Int. Cl.
*B01F 21/00* (2022.01)
*B01F 21/20* (2022.01)
(Continued)

(52) U.S. Cl.
CPC .............. *B01F 21/30* (2022.01); *B01F 21/20* (2022.01); *B01F 23/56* (2022.01); *B01F 23/59* (2022.01);
(Continued)

(58) Field of Classification Search
CPC .. B01F 35/881; B01F 35/71731; B01F 25/50; B01F 21/30; B01F 35/13; B01F 23/59
See application file for complete search history.

(56) References Cited

U.S. PATENT DOCUMENTS

2007/0125508 A1* 6/2007 McVane .................. B01F 25/50 164/412
2013/0258799 A1* 10/2013 Christy ............. B01F 35/71775 366/141
2013/0286767 A1* 10/2013 Gaultney ............... B01F 21/20 366/152.2

FOREIGN PATENT DOCUMENTS

CN 107553717 A 1/2018
EP 3076399 A1 10/2016
(Continued)

OTHER PUBLICATIONS

International Search Report for PCT/EP2021/086626, mailed Apr. 22, 2022, 4 pages.
(Continued)

*Primary Examiner* — Anshu Bhatia
(74) *Attorney, Agent, or Firm* — NIXON & VANDERHYE P.C.

(57) ABSTRACT

The present invention relates to apparatus for manufacturing at least one liquid, by dissolving or suspending powders in solvents. The apparatus may be arranged for inclusion in a pellet coating system to supply the liquid to a downstream apparatus such as a Post Pellet Liquid Application (PPLA, 44). The apparatus includes: a mixing system, comprising a mixing pump (27), a mixing vessel (33) and piping for mixing substances located in the mixing vessel (33) by liquid recirculation; solvent supply means, comprising a supply tank (37) arranged to supply solvent to the mixing vessel (33); a feeding system, comprising a Hopper (32) for
(Continued)

is a diagrammatic representation of a Programmable Logic Controller (PLC) used in the apparatus of Figure 1, the equipment controlled by the PLC, the sensors that provide data to the PLC, and a Human Machine Interface (HMI), which allows a user to set values for process parameters storing a first particulate material, a ramp arranged above a weighing tray (34) and a hopper vibrator (3.1) for feeding a first particulate material to the weighing tray (34); a weighing system located above the mixing vessel (33), the weighing system comprising the weighing tray (34), a weighing tray loadcell (5) for weighting a first particulate material and a weighing tray vibrator (4) for feeding a first particulate material to the mixing vessel (33); a blending vessel (40) to which a liquid comprising the first particulate material is transferred from the mixing vessel (33) and to which additional solvent may be added to reach a desired concentration of the first particulate material in the liquid; optionally a day tank (39) to which a liquid comprising the first particulate material is transferred from the blending vessel (40.1) for storage; and a control system, wherein a Programmable Logic Controller (PLC) (25) is arranged to receive signals from the weighing system and to control operation of at least part of the feed system according to the signals received from the weighing system to deliver a target mass of first and at least a second particulate material to the mixing vessel (33). The apparatus for manufacturing at least one liquid according to the invention may be connected to system for coating pellets, such as feed pellets. The system for coating pellets may include: the apparatus for manufacturing at least one liquid; a pellet source; a pellet coating device; means for feeding at least one liquid from the manufacturing apparatus to the pellet coating device; wherein the pellet coating device is arranged to apply the or each liquid to at least some of the pellets received from the pellet source. The present invention includes a method for manufacturing a liquid, by dissolving or suspending powders in solvents.

11 Claims, 8 Drawing Sheets

(51) Int. Cl.

| | |
|---|---|
| ***B01F 23/50*** | (2022.01) |
| ***B01F 25/50*** | (2022.01) |
| ***B01F 35/13*** | (2022.01) |
| ***B01F 35/71*** | (2022.01) |
| ***B01F 35/88*** | (2022.01) |
| *B01F 101/44* | (2022.01) |

(52) U.S. Cl.

CPC .............. *B01F 25/50* (2022.01); *B01F 35/13* (2022.01); *B01F 35/71731* (2022.01); *B01F 35/71785* (2022.01); *B01F 35/881* (2022.01); *B01F 2101/44* (2022.01)

(56) References Cited

FOREIGN PATENT DOCUMENTS

| | | |
|---|---|---|
| WO | 2012033747 A1 | 3/2012 |
| WO | 2018091585 A1 | 5/2018 |

OTHER PUBLICATIONS

Written Opinion of the ISA for PCT/EP2021/086626, mailed Apr. 22, 2022, 8 pages.
First Office Action, CN Application No. 2021800084871.4, Dec. 3, 2025.

* cited by examiner

Figure 1 is a diagrammatic representation of a first embodiment of the apparatus according to the invention, which includes apparatus for dissolving powders in liquids;

Figure 2 is a detailed view of part of the apparatus of Figure 1, which feeds particulate material from a weighting tray (34) to a mixing vessel (33), which includes a weighing tray vibrator (4) and a weighing tray Loadcell (5) arranged to discharge weighted granules into the mixing vessel (33);

FIG. 3

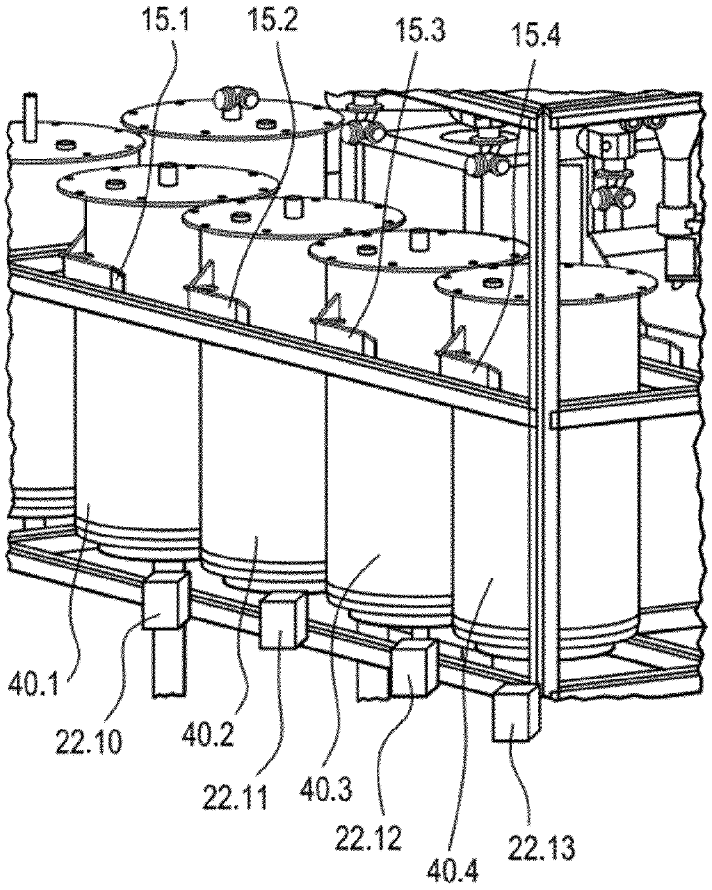

Figure 3 is a detailed view of part of the apparatus of Figure 1, which recieves liquid from a mixing vessel (33) into blending vessels (40.1-40.4), which includes Process valves (22.1-22.4) through which the liquid from the mixing vessel (33) is pumped into blending vessels (40.1-40.4) before water is be added through the mixing vessel (33) into blending vessels (40.1-40.4) to ensure all the product is removed from the mixing vessel (33) & pipework and the weight of the solution that has been transferred to the Blending Vessel is taken trough the Blending vessel Loadcells (15.1-15.4) and more water is added to reach the desired final concentration of the liquid.

Figure 4 is a diagrammatic representation of a Programmable Logic Controller (PLC) used in the apparatus of Figure 1, the equipment controlled by the PLC, the sensors that provide data to the PLC, and a Human Machine Interface (HMI), which allows a user to set values for process parameters Figure 5 is a diagrammatic representation of a view from top down of the apparatus of Figure 1, which includes apparatus for dissolving powders in liquids;

Figure 6 is a diagrammatic representation of a side view of the apparatus of Figure 1, which includes apparatus for dissolving powders in liquids;

Figure 7 is a diagrammatic representation of the apparatus of Figure 1, which includes apparatus for dissolving powders in liquids;

Figure 8 is a diagrammatic representation of the apparatus of Figure 1, which includes a connection to an apparatus for dissolving powders in liquids;

APPARATUS AND METHOD FOR DISSOLVING POWDERS IN SOLVENTS

CROSS-REFERENCE TO RELATED APPLICATIONS

This application is the U.S. national phase of International Application No. PCT/EP2021/086626 filed Dec. 17, 2021, which designated the U.S. and claims priority to EP Patent Application No. 20215191.6 filed Dec. 17, 2020, the entire contents of each of which are hereby incorporated by reference.

BACKGROUND OF THE INVENTION

Many industries use liquids comprising dissolved or suspended powders. For example, supplying liquids comprising dissolved or suspended powders to animals in their drinking water or coating pellets with such liquids is important for feed manufacturing.

However, such liquids are usually manufactured off site by a supplier and then transported to the site typically by road or rail in containers. The containers are stored, for example in a warehouse, until required. Refrigerated transport and storage is often necessary. When required for application, the containers need to be moved, connected, emptied, cleaned and disposed of.

A problem with this system is that liquids are heavy and expensive to transport and store. To replace an empty canister with a full one requires lifting equipment as these canisters are typically heavy.

An additional problem is that for some powders dissolved or suspended in solvents, such as liquid enzymes, activity can deteriorate significantly with time. Thus making a batch of liquid off site and transporting it to the place of use can reduce the effectiveness of the liquid.

There is a need for a system that can produce “instantaneous” liquids “on site” for their use in e.g. a feed manufacturing line. Accordingly the present invention seeks to provide an apparatus, a system and method that mitigates at least one of the aforementioned problems, or at least provides an alternative to existing apparatus, systems and methods.

Such a system that can produce “instantaneous” liquids would combine the benefit that powders or granules are easier to transport, but easier to apply to feed or administer to animals in liquid form. Additionally, handling liquids is safer for workers, since powders tend to develop harmful dust.

SUMMARY OF THE INVENTION

The present invention solves the need for a system that can produce “instantaneous” liquids for their use in e.g. a feed manufacturing line.

The present invention relates to an apparatus for manufacturing at least one liquid, by dissolving or suspending powders in solvents. The apparatus may be arranged for inclusion in a pellet coating system to supply the liquid to a downstream apparatus such as a Post Pellet Liquid Application (PPLA).

The apparatus includes:

- a mixing system, comprising a mixing pump (27), a mixing vessel (33) and piping for dissolving or suspending substances located in the mixing vessel (33) in a solvent by liquid recirculation;

- solvent supply means, comprising a supply tank (37) arranged to supply solvent to the mixing vessel (33);
- a feeding system, comprising a Hopper (32) for storing a first particulate material and a hopper vibrator (3) for feeding a particulate material to the weighing tray (34); The hopper vibrator (3) comprises a ramp arranged above a weighing tray (34) and a hopper vibrator.
- a weighing system located above the mixing vessel (33), the weighing system comprising the weighing tray (34), a weighing tray loadcell (5) for weighting the particulate material and a weighing tray vibrator (4) for feeding the particulate material to the mixing vessel (33);
- a blending vessel (40) to which a liquid comprising the dissolved or suspended particulate material is transferred from the mixing vessel (33) and to which additional solvent may be added to reach a desired concentration of the particulate material in the liquid;
- optionally a day tank (39) to which a liquid comprising the first particulate material is transferred from the blending vessel (40) for storage;
- and a control system, wherein a Programmable Logic Controller (PLC) (25) is arranged to receive signals from the weighing system and to control operation of at least part of the feed system according to the signals received from the weighing system to deliver a target mass of particulate material to the mixing vessel (33) and a Human Machine Interface (HMI) allows human interaction. Further the PLC may receive signals from the other systems and control the solvent supply means, the mixing system, the cleaning process, the alarms, the blending vessel and optionally the day tank to dissolve or suspend the particulate in a solvent and subsequently move the liquid to the blending vessel, and optionally to the day tank.

Optionally, the particulate material(s) may be scanned by additional equipment before filling the hopper(s) (32). The PLC (25) may then recognize different particulate materials and may initiate an alarm if the wrong particulate material is being filled in a hopper (32).

The apparatus for manufacturing a liquid according to the invention may be connected to a system for coating pellets, such as feed pellets. The system for coating pellets may include: the apparatus for manufacturing a liquid; a. pellet source; a pellet coating device; means for feeding the liquid from the manufacturing apparatus to the pellet coating device; wherein the pellet coating device is arranged to apply the liquid to at least some of the pellets received from the pellet source. The present invention includes a method for manufacturing a liquid, by dissolving or suspending powders in solvents.

DESCRIPTION OF THE FIGURES

FIG. 3 is a detailed view of part of the apparatus of FIG. 1, which receives liquid from a mixing vessel (33) into blending vessels (40.1-40.4), which includes Process valves (22.1-22.4) through which the liquid from the mixing vessel (33) is pumped into blending vessels (40.1-40.4) before water is be added through the mixing vessel (33) into blending vessels (40.1-40.4) to ensure all the product is removed from the mixing vessel (33) & pipework and the weight of the solution that has been transferred to the Blending Vessel is taken trough the Blending vessel Load-cells (15.1-15.4) and more water is added to reach the desired final concentration of the liquid;

DETAILED DESCRIPTION

Figure 1:
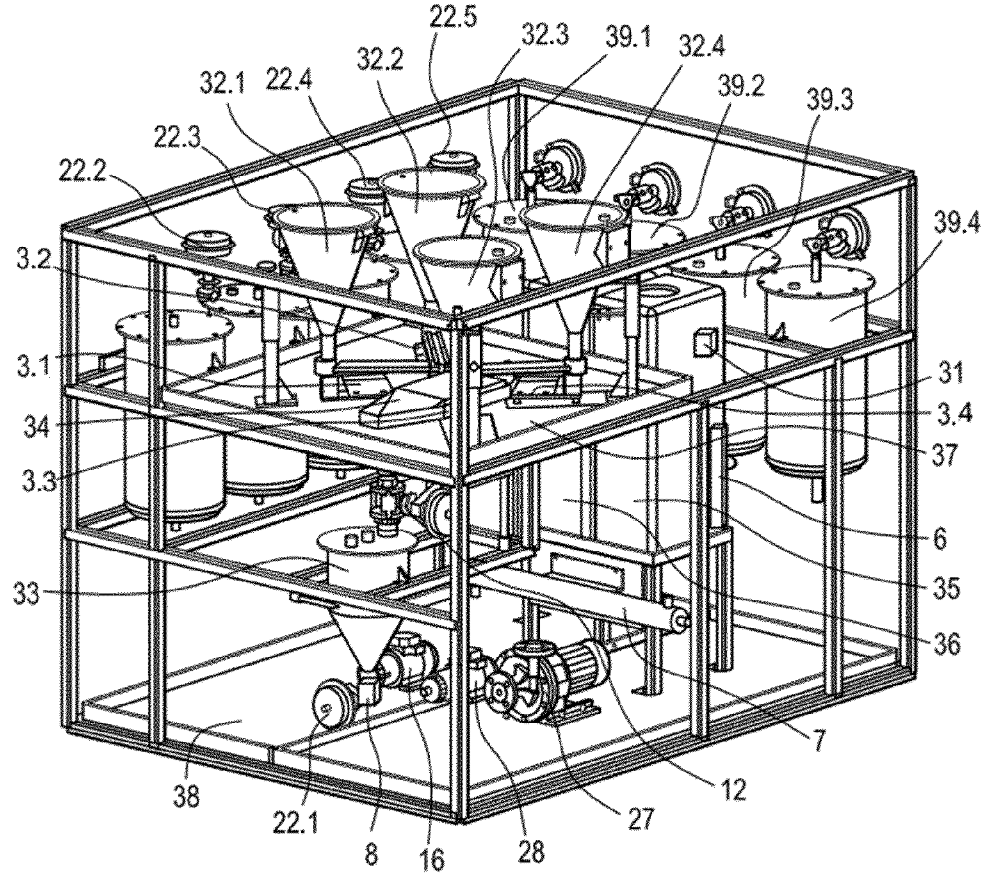
FIG. 1 is a diagrammatic representation of a first embodiment of the apparatus according to the invention, which includes apparatus for dissolving powders in liquids.

According to one aspect of the invention there is provided apparatus for manufacturing a liquid, by dissolving or suspending powders in solvents, and includes: a mixing vessel; a mixing system for mixing substances located in the mixing vessel; solvent supply means arranged to supply solvent to the mixing vessel; a feeding system for storing and feeding a particulate material to the weighing system; a weighing system for weighting the particulate material; a blending vessel; optionally a day tank; and a control system to receive signals from the weighing system and to control operation of at least part of the feed system.

The feeding system is arranged to feed particulate material to the weighing system, and to feed particulate material from the weighing system to the mixing vessel. The feed system transports particulate material along a feed path from the hopper to the mixing vessel. The weighing system is located on the feed path between the hopper and the mixing vessel. The weighing system is arranged to weigh particulate material. The weighing system determines a mass of particulate material dispensed from the hopper. This enables the control system to accurately control the mass of the particulate material delivered to the mixing vessel.

The feeding system includes a ramp, which is located blow the hopper and mounted on a hopper vibrator (3), arranged to feed material from the hopper to the weighing system and the control system is arranged to control operation of the hopper vibrator (3) according to signals received from weighing system. Thus the control system controls the quantity of particulate material dispensed from the hopper to the weighing system to achieve the target mass.

The control system is arranged to cease feeding particulate material to the weighing system, in response to the control system determining from the signals received from the weighing system that the target mass of first particulate material has been fed to the weighing system. For example, the control system is arranged to cease operation of the feeder.

The feed system includes a second feeder arranged to feed any particulate material from the weighing system to the mixing vessel.

The control system is arranged to control operation of the second feeder according to signals received from the weighing system. The control system is arranged to actuate the second feeder in response to the control system determining from the signals received from the weighing system that the target mass of first particulate material has been fed to the weighing system.

Alarms indicate some issue in the system needs to be checked or there is a stopping issue.

At least part of the second feeder is mounted on the weighing system. The weighing system is arranged to weigh particulate material carried by the second feeder.

The control system is arranged to adjust the rate at which the first feeder dispenses particulate material to the weighing system. This helps to ensure that the target mass is accurately achieved.

The control system includes a user input device and memory, which enables a user to specify at least one of: the quantity, typically by mass, of the first particulate material to be delivered to the mixing vessel; the quantity, typically by mass, of the second particulate material to be delivered to the mixing vessel; the quantity of solvent, typically by volume or mass, supplied to the mixing vessel; and the mixing time for the mixing device. This enables the user to specify the concentration for the liquid. The set values are stored in the memory, and these are used as target values by the control system. The control system compares the signals received from the weighing system with the respective target values stored in memory to determine when to cease dispensing particulate material. The control system compares the signals received from the flow measurement device to determine when to cease supplying solvent to the mixing vessel. In preferred embodiments, the user interface is arranged to enable a user to store at least one formula for producing a liquid in the memory. The user interface enables the user to input values for at least some of the following when defining a formula: the choice of particulate material; the quantity of solvent; the quantity of particulate material; the ratio of particulate material:solvent; the tolerance for the quantity of particulate material; and the mixing time.

In preferred embodiments, the apparatus is arranged to produce batches of liquid enzyme.

The control system includes a display device, and is arranged to display at least one of the following: the set quantity of the particulate material to be delivered to the or each mixing vessel; the quantity of particulate material already delivered; the current value of particulate material from the weighing system; the set quantity of solvent supplied to the mixing vessel; the quantity of solvent currently delivered to the or each mixing vessel; the set mixing time for each mixing system; and the mixing time elapsed since commencing the mixing process.

The solvent supply means includes at least one flowmeter, and the control system is arranged to control the quantity of solvent supplied to the mixing vessel according to signals received from the at least one flowmeter. Typically the control system is arranged to control the volume or mass of solvent supplied to the mixing vessel. The control system closes a valve in response to determining that a target volume or mass of solvent is supplied to the mixing vessel.

The solvent supply means includes at least one valve and the control system is arranged to control operation of the at least one valve according to signals received from the flowmeter.

The mixing vessel includes a first sensor, and the control system is arranged to actuate the mixing system when the first sensor detects the presence of solvent in the mixing vessel. The first sensor is located in a lower part of the respective mixing vessel.

The mixing vessel includes a second sensor, which is arranged as an overfill safety sensor, and the control system is arranged to cease supplying solvent to the mixing vessel in response to the second sensor detecting solvent. The second sensor is located in an upper part of the mixing vessel.

The control system is arranged to supply at least some solvent to the mixing vessel prior to delivering particulate material to the mixing vessel.

The control system controls operation of the mixing device.

The mixing setup includes a piping system for recirculating the solvent through the mixing vessel and the attached circulation piping for mixing substances located in the mixing vessel. The mixing setup device includes a mixing pump (27) for driving the circulation of the solvent through the mixing vessel and the attached circulation piping for mixing substances located in the mixing vessel.

Figure 8:
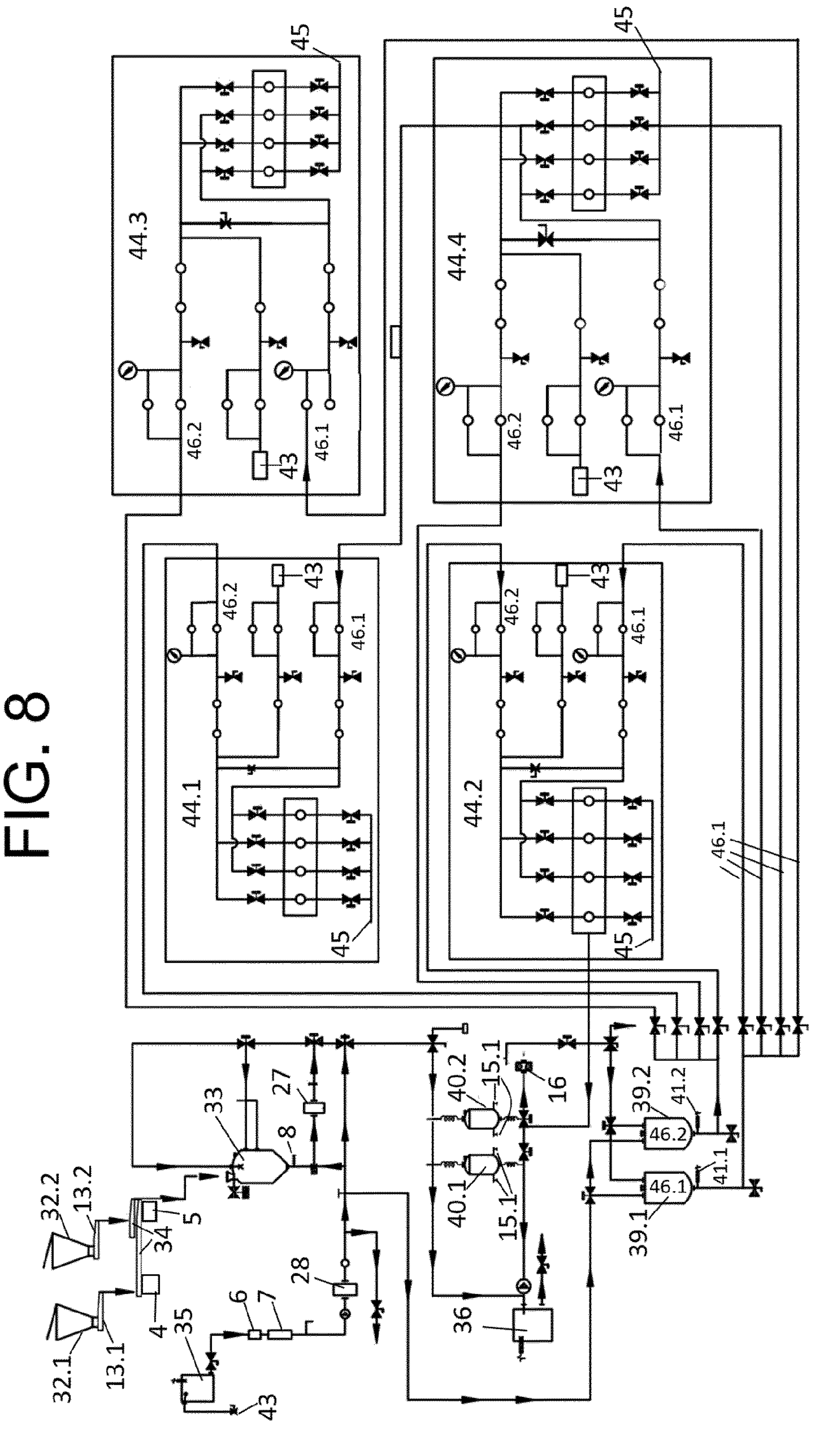
FIG. 8 is a diagrammatic representation of the apparatus of FIG. 1, which includes apparatus for dissolving powders in liquids, comprising a schematic representation of piping connections and solvent/liquid flow.

The mixing system (as shown in FIG. 8) dissolves or suspends the particulate material in solvent by liquid recirculation. Solvent is pumped from the supply tank (35), passed through a particle filter (6) to reduce impurities and UV treatment (7) reducing bacterial contamination and into the mixing vessel (33) from the bottom. Filling the mixing vessel through the Solvent supply valve to mixing vessel (30) located at the bottom of the mixing vessel. Filling the mixing vessel from the bottom instead from the top avoids the problem that powder sticks to the walls of the mixing vessel when pouring the powder inside. Part of the solvent is filled in the mixing vessel before addition of the particulate material. During addition of the particulate material the solvent is recirculated through the mixing vessel, in through the Solvent supply valve to mixing vessel (30) and out through the mixing vessel discharge valve below the mixing vessel, and connected piping to mix or suspend the particulate material in the solvent to produce the liquid. Such a liquid recirculation system has various advantages compared to commonly used mixing chambers. A liquid recirculation system may be fitted in smaller space and is more compact and more energy efficient than a mixing chamber and allows for more gentle mixing that may protect sensitive products as well as reducing negative effects, such as smoke or foam build up.

The control system controls operation of the mixing setup by controlling the mixing pump (27), for example the control unit may control the rate at which the mixing pump (27) circulates the solvent.

The control system includes a timer and operates the mixing setup for a set period of time when producing a batch of liquid.

The mixing setup is mounted within a frame on damping means. This reduces the impact of vibrations from the mixing device on the weighing system.

The control system is arranged to actuate the mixing setup prior to delivering particulate material to the mixing vessel. The control system actuates the mixing pump (27) prior to delivering particulate material to the mixing vessel, this provides turbulence in the solvent which assists the particulate material to dissolve or be suspended.

The mixing vessel includes a discharge valve for discharging liquid from the mixing vessel, and the control system is arranged to control operation of the mixing vessel discharge valve.

The control system is arranged to automatically open the mixing vessel discharge valve at the end of a mixing process, for example in response to the set mixing time period elapsing.

The apparatus includes at least one blending vessel, which is connected in series with the mixing vessel discharge valve, and is arranged for blending liquid produced in the mixing vessel. Blending for the purpose of this invention means that more solvent is added, preferably through the mixing setup to flush remaining liquid into the blending vessel, to dilute the liquid to a desired final concentration. The mixing vessel is connected to the blending vessel by piping.

The blending vessel includes a Blending vessel low level sensor (14) located towards its base, and the control system is arranged to determine from the signals received from the sensor that a low level condition has occurred. The control system may use this signal, for example to initiate a new batch of liquid. Alternatively to a low level sensor (14) and/or a high level sensor, a pressure sensor that detects presence absence of liquid may be used. The control system may use this signal, for example to initiate a new batch of liquid or, according to the amount of pressure, stop the loading of the vessel.

Optionally, the apparatus includes at least one day tank, which is connected in series with the blending vessel discharge valve, and is arranged for storing liquid produced in the blending vessel. The blending vessel is connected to the day tank by piping. The day tank provides an intermediate storage for the liquid. The liquid is stored temporarily in the day tank until it is required for use, for example in a pellet coating process.

The day tank includes a day tank low level sensor (18) located towards its base, and the control system is arranged to determine from the signals received from the sensor that a low level condition has occurred. The control system may use this signal, for example to initiate a new batch of liquid. Alternatively to a low level sensor (18) and/or a high level sensor, a day tank pressure sensor (40) that detects presence absence of liquid may be used. The control system may use this signal, for example to initiate a new batch of liquid or, according to the amount of pressure, stop the loading of the vessel.

The apparatus includes at least one pump arranged to pump liquid from the mixing vessel. Liquid is pumped from the mixing vessel via the discharge valve.

The apparatus may optionally comprise at least one day tank for storage of the liquid. In another embodiment, the apparatus may include at least one pump arranged to pump liquid from the day tank to an optionally connected downstream apparatus, such as a pellet coating station. The liquid is applied to pellets at the pellet coating station. 'The output side of the or each day tank is connected to at least one supply line for delivering liquid to a pellet coating process, or a day tank, an intermediate storage vessel. The pump is arranged to pump the liquid along the or each supply line.

Vibrating feeders, also called vibration dosers, are particularly useful for delivering particulate materials to the mixing vessel. Dosing using vibration dosers supplies the same accuracy than other dosing systems, but vibration dosers are more robust, easier to clean, easier to maintain and require less maintenance. For example, the vibrating feeder can include a support member, such as a ramp, for carrying the particulate material and a vibration unit, such as a hopper vibrator (3), for vibrating the support member. The vibration unit preferably includes electromagnet arrangement to vibrate.

The hopper serves as a storage vessel for the particulate material(s) and is connected to a vibrating feeder. The apparatus may comprise more than one hopper, which is connected to an additional vibrating feeder.

The hopper includes at least one wall, which is inclined to a horizontal axis. The wall is inclined steeply. The angle subtended between the horizontal axis and the inclined wall is typically greater or equal to 60 degrees, preferably 70 degrees and more preferably still 80 degrees. This helps the particulate material to flow out of the hopper.

The weighing system is mounted to a frame by a damping arrangement. The damping arrangement reduces the effect of vibrations, for example vibrations generated by the or each feeder, mixing device and pump on the operation of the weighing system.

The apparatus includes a cleaning system arranged to clean the mixing vessel, connected piping, blending vessel (s), and optionally day tank(s) with solvent from the solvent supply means. The waste material goes into the CIP waste tank (36). wherein the control system is arranged to control operation of the cleaning system.

Clean-in-place (CIP) ensures cleaning of the mixing vessel and blending vessel, the piping, and, optionally, the day tank. CIP is a method of automated cleaning interior surfaces, such as of pipes, vessels, equipment, filters and associated fittings, without major disassembly. CIP employs the mixing pump (27) to clean the mixing system and blending vessel and connected piping with solvent from the solvent supply system. CIP may, optionally, further clean the day tank. The CIP valve to day tank (24) opens when the CIP cleans the Day tanks. The waste material goes into the CIP waste tank (36). The control system is arranged to control operation of the cleaning system. CIP may be started manually or programmed to start automatically. CIP may be started at any time during the liquid production process, such as before a change of powder, between each batch of liquid, before a longer break production (e.g., before the weekend), or in regular intervals.

The user interface is arranged to enable a user to specify the period of time for which the cleaning system operates.

The apparatus includes a main frame arranged to support, either directly or indirectly, at least some, and preferably each, of the following equipment: the mixing vessel; the or each feeder; the or each hopper; the or each blending vessel; the solvent supply means; the weighing system; the mixing setup. The apparatus can be in the form of a standalone unit, which can be retro-fitted to an existing pellet manufacturing system or post pelleting liquid application system (PPLA). The solvent supply means includes suitable connectors for connecting to a solvent source such as a mains supply or storage tank.

Optionally the Main Frame may be enlarged to additionally support, either directly or indirectly, the or each day tank.

The main frame is mounted on dampers. This reduces vibrations transmitted to the frame, and equipment mounted thereon.

The apparatus includes a main housing arranged to house at least some, and preferably each, of the following equipment: the mixing vessel; the or each vibrating feeder; the or each blending vessel; the solvent supply means; the weighing system; the mixing setup; the control system.

Optionally the Main housing may be enlarged to additionally support, either directly or indirectly, the or each day tank.

The apparatus may optionally include an air conditioning unit to condition the air within the apparatus housing. Preferably, the air conditioning unit may be operated to keep the temperature of the atmosphere within the housing below a predetermined temperature, in particular below a temperature which is not higher than 25° C. and/or to keep the relative humidity of the atmosphere within the housing below a predetermined relative humidity, in particular below a relative humidity which is not higher than 30%.

A door can be provided for accessing the equipment stored in the housing.

The control system user interface is attached to the main frame and accessible from outside of the main housing, for example, in a separate control system housing, which is attached to the main housing. The control system housing also stores a PLC.

According to another aspect of the invention the apparatus may be directly connected to a system for coating pellets, such as feed pellets. In preferred embodiments the liquid is pumped from the manufacturing apparatus to the pellet coating device. The manufacturing apparatus is connected to the pellet coating device by a supply line, which may include one or more day tanks. The pump is arranged to pump the liquid from the mixing vessel to the day tank via the piping. In one embodiment, the same pump may be used for mixing, for transferring liquid and solvent and for cleaning, but may only be used for one of these at a time.

According to another aspect of the invention there is provided a method for manufacturing a liquid, the method including: storing in a hopper a particulate material; supplying solvent to a mixing vessel; actuating a mixing pump (27); a feeding system feeding particulate material to the mixing vessel; providing weighing means; a control system receiving signals from the weighing system and controlling operation of at least part of a feed system according to the signals received from the weighing system to control the mass of particulate material fed to the mixing vessel.

The method includes providing a first (vibrating) feeder arranged to feed particulate material to the weighing system; and the control system ceasing feeding particulate material in response to determining from signals received from the weighing system that a target mass of particulate material is achieved. For example, by ceasing operation of the first (vibrating) feeder.

The method includes providing a second feeder arranged to feed particulate material from the weighing system to the mixing vessel.

The method includes the control system feeding the particulate material to the mixing vessel in response to determining from the signals received from the weighing system that the target mass of particulate material is detected by the weighing system.

The method includes the control system adjusting the rate at which the or each first feeder dispenses particulate material to the weighing system. This helps to improve the dispensing accuracy.

The method may optionally include keeping the temperature of said first particulate material and, when present, of said second particulate material below a predetermined temperature, in particular below a temperature which is not higher than 25° C. The method may further include keeping the relative humidity of the atmosphere surrounding said first particulate material and, when present, of said second particulate material, below a predetermined relative humidity, in particular below a relative humidity which is not higher than 30%.

The method includes providing a user input device and memory.

The method includes the user specifying at least one of the following to create a batch of liquid: the quantity of the first particulate material to be delivered to the or each mixing vessel; the quantity of the second particulate material to be delivered to the or each mixing vessel; the quantity of water supplied to the or each mixing vessel; and the mixing time for the or each mixing device.

The method includes the user storing in the memory at least one formula for producing a batch of liquid. The user inputs values for at least some of the following parameters when defining a formula: the choice of particulate material; the quantity of water; the quantity of particulate material; the ratio of particulate material to water; the tolerance for the quantity of particulate material; and the mixing time.

The control system includes a display device, which displays at least one of the following: the set quantity of the first particulate material to be delivered to the mixing vessel; the quantity of first particulate material already delivered; the current value of first particulate material from the weighing system; the set quantity of the second particulate material to be delivered to the or each mixing vessel; the quantity of second particulate material already delivered; the current value of second particulate material from the weighing system; the set quantity of solvent supplied to the mixing vessel; the quantity of solvent currently delivered to the mixing vessel; the set mixing time for the mixing device; and the mixing time elapsed since commencing the mixing process.

The method includes providing solvent supply means and at least one flowmeter. The control system controls the quantity of solvent supplied to the mixing vessel according to signals received from the at least one flowmeter.

The solvent supply means includes at least one valve. The control system controls operation of at least one valve according to signals received from the flowmeter.

The mixing vessel includes a liquid detection sensor, and the control system actuates the mixing setup in response to the first sensor detecting the presence of solvent or liquid in the mixing vessel, and preferably detecting the presence of water. The control system distinguishes between liquid manufacture operations and cleaning operations. The mixing setup may be used for cleaning operation.

The method includes the control system supplying at least some solvent to the mixing vessel prior to delivering particulate material to the mixing vessel.

The method includes providing a mixing setup having a mixing pump for pumping solvent and/or liquid through the mixing vessel and connected piping. The control system includes a timer. The control system operates the mixing pump for a set period of time.

The method includes the control system actuating the mixing setup prior to delivering particulate material to the mixing vessel.

The method includes providing a discharge valve for discharging liquid from the mixing vessel, and the control system automatically opening the discharge valve at the end of the mixing process, for example in response to the mixing device ceasing operation.

The method includes providing at least one blending vessel, which is arranged for accepting liquid produced in the mixing vessel and additional solvent until a liquid of the desired final concentration is produced. At least one blending vessel is connected in series with the mixing vessel discharge valve. The blending vessel includes a low liquid level sensor, the blending vessel low level sensor, located towards its base. Alternatively to the low level sensor (14) the blending vessel may include a pressure sensor, the blending vessel pressure sensor, located towards its base.

The method includes optionally providing at least one day tank, which is arranged for storing liquid produced in at least one blending vessel. At least one day tank is connected in series with at least one blending vessel discharge valve. The or each day tank includes a low liquid level sensor, the day tank low level sensor, located towards its base. Alternatively to the low level sensor the day tank may include a pressure sensor (40), the day tank pressure sensor (40), located towards its base.

The method includes the control system manufacturing a new batch of liquid in response to signals received from a sensor. The control system may be programmed to start a new batch of liquid at any desired point in time, such as for example after the mixing vessel has been emptied, after the blending vessel has been emptied, after the day tank has been emptied, but at the earliest after the mixing vessel has been emptied and the liquid has been transferred to the blending vessel. The control system may be programmed to start a new batch of liquid in response to signals received from the low liquid level sensor in the blending vessel or in response to signals received from the low liquid level sensor in the day tank or in response to signals received from the day tank pressure sensor (40) in the mixing vessel showing no liquid is left in the mixing vessel.

The method includes providing at least one pump arranged to pump liquid to the mixing vessel, and pumping liquid from the mixing vessel.

The method includes providing at least one pump arranged to pump liquid from the mixing vessel to downstream at least one blending vessel.

In one embodiment, the same pump is used for mixing, for transferring liquid and solvent and for cleaning, but may only be used for one of these at a time.

Optionally, the method includes providing at least one pump arranged to pump liquid from the at least one blending vessel to downstream at least one day tank. In a preferred embodiment, if more than one blending vessel is present, only one ump is used to transfer liquid from all blending vessels downstream to at least one day tank.

The method may include providing at least one pump arranged to pump liquid from at least one blending vessel to downstream apparatus, such as a pellet coating station. Optionally, if the embodiment includes at least one day tank, the method may include providing at least one pump arranged to pump liquid from at least one day tank to downstream apparatus, such as a pellet coating station.

The or each of the first feeders includes a vibration unit. The method includes feeding particulate material to the weighing system by actuating the vibration drive unit.

The or each of the second feeders includes a vibration unit. The method includes feeding particulate material to the mixing vessel by actuating the vibration drive unit.

The method includes providing a cleaning system arranged to clean at least one of: the mixing vessel, the at least one blending vessel and at least one day tank; and the control system cleaning the or each vessel and or tank. The user specifies the period of time for which the cleaning system operates, via the user interface.

The method includes providing the apparatus in the form of a standalone unit; and includes retro-fitting an existing pellet manufacturing system with the apparatus.

According to another aspect of the invention there is provided apparatus for manufacturing a liquid, wherein the apparatus may be arranged for inclusion in a pellet manufacturing system to supply the liquid to downstream apparatus such as a pellet coating station, and includes: a mixing vessel; a mixing system for mixing substances located in the mixing vessel; solvent supply means arranged to supply solvent to the mixing vessel; a hopper for storing a particulate material; a first feeding system and feeding a particulate material to the weighing system; a weighing system for weighting a particulate material; a blending vessel; optionally day tank; and a control system.

Advantageously the apparatus can be arranged according to any configuration described herein. For example, the control system can be arranged to receive signals from the weighing system and to control operation of at least part of the feeding system according to the signals received from the weighing system to deliver a target mass of first particulate material to the mixing vessel. The control system can be arranged to control operation of at least part of the feed system according to the signals received from the weighing system to deliver a target mass of second particulate material to the mixing vessel.

A list of parts of the apparatus according to the invention is given in Table 1. The parts of the apparatus according to the invention may not be limited to this list. Specific embodiments of the apparatus according to the invention may comprise some, but not necessarily al of the listed parts.

| Number | Name |
|---|---|
| 1 | Hoper Low level sensor |
| 2 | Hoper high sensor level |
| 3.1 | Hopper Vibrator |
| 3.2 | Hopper Vibrator |
| 3.3 | Hopper Vibrator |
| 3.4 | Hopper Vibrator |
| 4 | Weighing tray vibrator |
| 5 | Weighing tray Loadcell |
| 6 | Particle filter |
| 7 | UV treatment |
| 8 | mixing vessel pressure sensor |
| | Supply Tank low level sensor |
| 9 | Supply Tank High level sensor |
| | Supply Tank Pressure Sensor |
| 10 | Mixing vessel low level sensor |
| 11 | Mixing vessel High level sensor |
| 12 | Powder supply valve |
| 13.1 | Vibrating feeder |
| 13.2 | Vibrating feeder |
| 13.3 | Vibrating feeder |
| 13.4 | Vibrating feeder |
| 15.1 | Blending Pressure Sensor |
| 15.2 | Blending Pressure Sensor |
| 15.3 | Blending Pressure Sensor |
| 15.4 | Blending Pressure Sensor |
| 16 | Blending vessel transfer pump |
| 17 | Day Tank valve |
| 18 | Day Tank low level sensor |
| 19 | Day Tank High level sensor |
| | Day Tank Pressure Sensor |
| 20 | CIP waste tank high level sensor |
| | CIP waste tank low level sensor |
| | CIP waste tank Pressure Sensor |
| | CIP valve to mixing vessel |
| 21 | CIP cleaning nozzle |
| 22.1 | Mixing vessel discharge valve |
| 22.2 | Process valve (filling up blending vessel) |
| 22.3 | Process valve (filling up blending vessel) |
| 22.4 | Process valve (filling up blending vessel) |
| 22.5 | Process valve (filling up blending vessel) |
| 22.6 | Process valve (filling up tank) |
| 22.7 | Process valve (filling up tank) |
| 22.8 | Process valve (filling up tank) |

-continued

| Number | Name |
|---|---|
| 22.9 | Process valve (filling up tank) |
| 22.10 | blending vessel discharge valve |
| 22.11 | blending vessel discharge valve |
| 22.12 | blending vessel discharge valve |
| 22.13 | blending vessel discharge valve |
| 23 | CIP valve to blending vessel |
| 24 | CIP valve to day tank |
| 25 | Programmable Logic Controller (PLC) |
| 26 | Human Machine Interface (HMI) |
| 27 | Mixing/CIP/Transfer pump |
| 28 | Solvent pump |
| 29 | Solvent Flowmeter |
| 30 | Solvent supply valve to mixing vessel |
| | Solvent supply valve to blending vessel |
| 31 | Solvent backflow CAT4 |
| 32.1 | Hopper |
| 32.2 | Hopper |
| 32.3 | Hopper |
| 32.4 | Hopper |
| 33 | Mixing vessel |
| 34 | Weighing tray |
| 35 | Supply tank |
| 36 | CIP waste tank |
| 37 | Dry/wet separation tray |
| 38 | Drip tray/liquid retention tray |
| 39.1 | Day tank |
| 39.2 | Day tank |
| 39.3 | Day tank |
| 39.4 | Day tank |
| 40.1 | Blending vessel |
| 40.2 | Blending vessel |
| 40.3 | Blending vessel |
| 40.4 | Blending vessel |
| 41.1 | Day tank pressure sensor |
| 41.2 | Day tank pressure sensor |
| 41.3 | Day tank pressure sensor |
| 41.4 | Day tank pressure sensor |
| | Main frame |
| 42.1 | Blending vessel loadcell |
| 42.2 | Blending vessel loadcell |
| 42.3 | Blending vessel loadcell |
| 42.4 | vessel loadcell |
| 43 | main water supply |
| 44 | PPLA |
| 45 | Air supply |
| 46.1 | Liquid 1 |
| 46.2 | Liquid2 |

Table 1 is a list of parts of the apparatus according to the invention, which includes apparatus for dissolving powders in liquids;

Example 1

Figure 2:
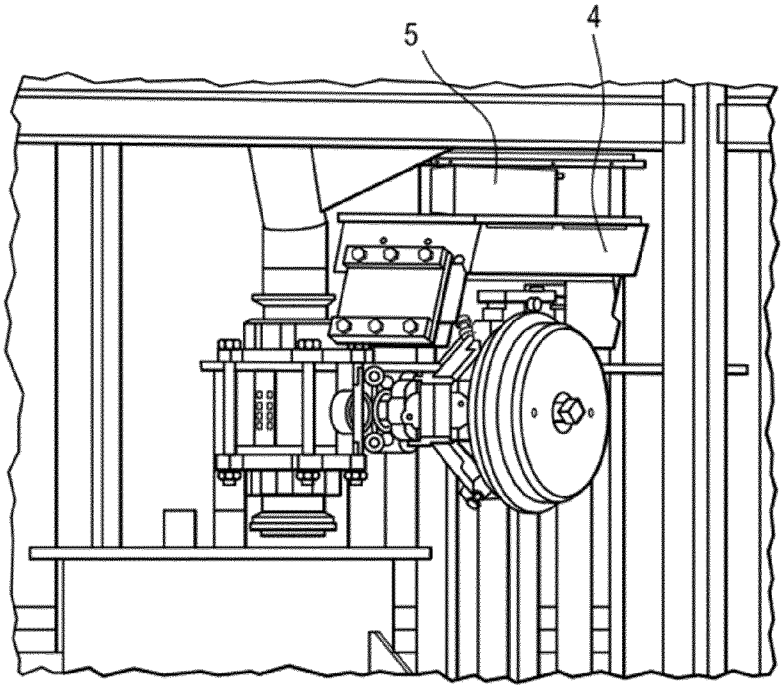
FIG. 2 is a detailed view of part of the apparatus of FIG. 1, which feeds particulate material from a weighting tray (34) to a mixing vessel (33), which includes a weighing tray vibrator (4) and a weighing tray Loadcell (5) arranged to discharge weighted granules into the mixing vessel (33)
Figure 4:
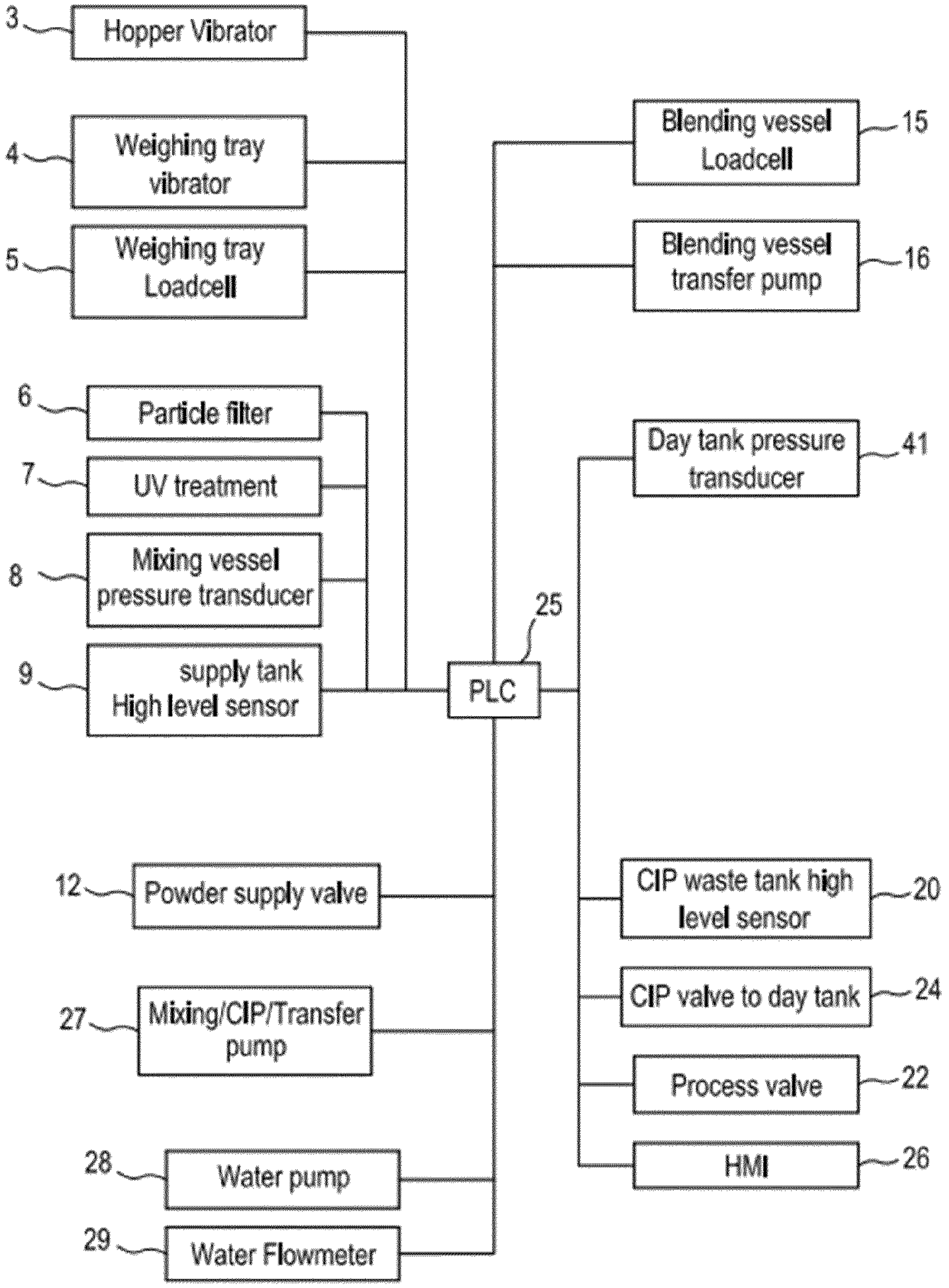
FIG. 4 is a diagrammatic representation of a Programmable Logic Controller (PLC) used in the apparatus of FIG. 1, the equipment controlled by the PLC, the sensors that provide data to the PLC, and a Human Machine interface (HMI), which allows a user to set values for process parameters.
Figure 5:
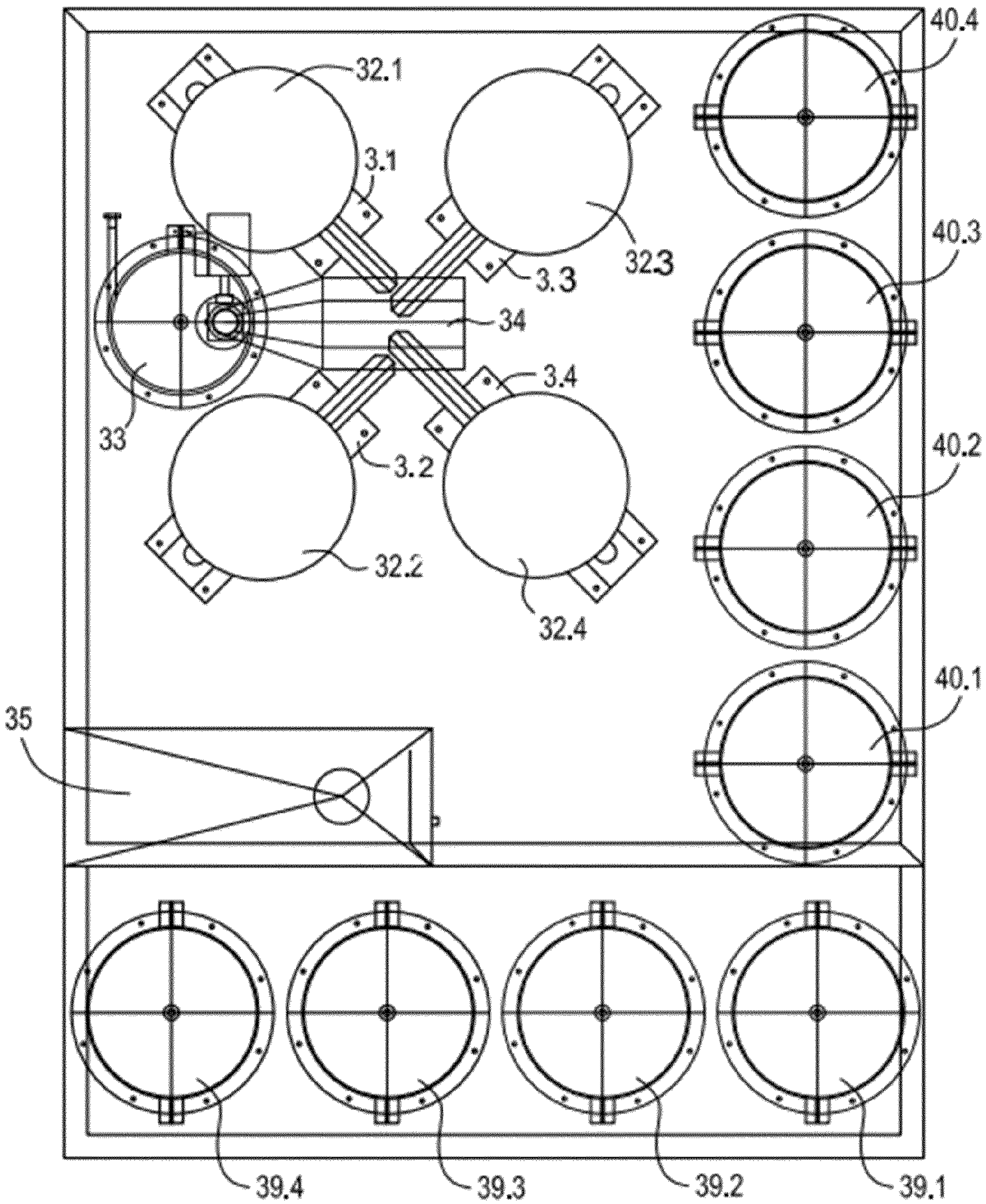
FIG. 5 is a diagrammatic representation of a view from top down of the apparatus of FIG. 1, which includes apparatus for dissolving powders in liquids.
Figure 6:
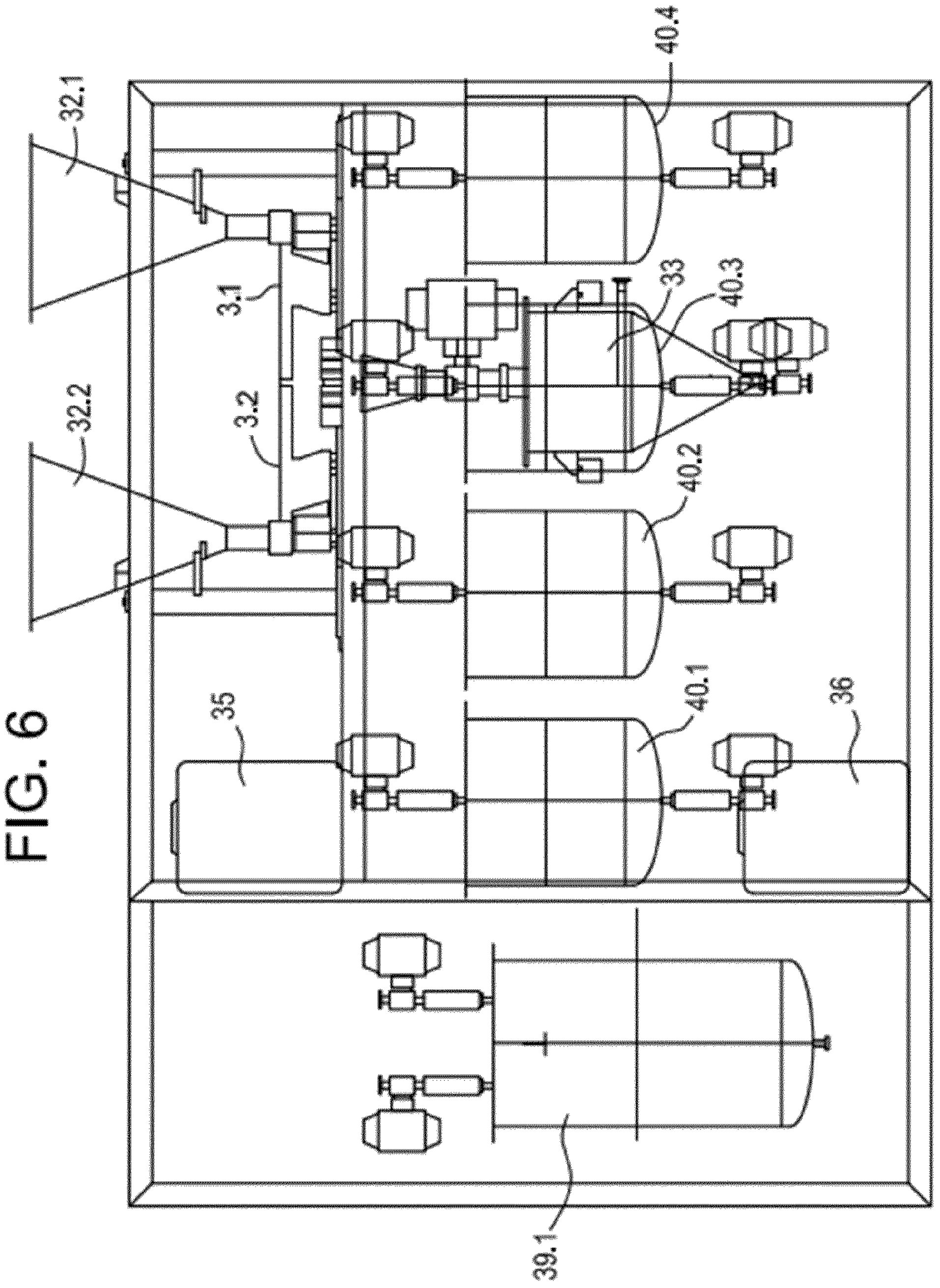
FIG. 6 is a diagrammatic representation of a side view of the apparatus of FIG. 1, which includes apparatus for dissolving powders in liquids.
Figure 7:
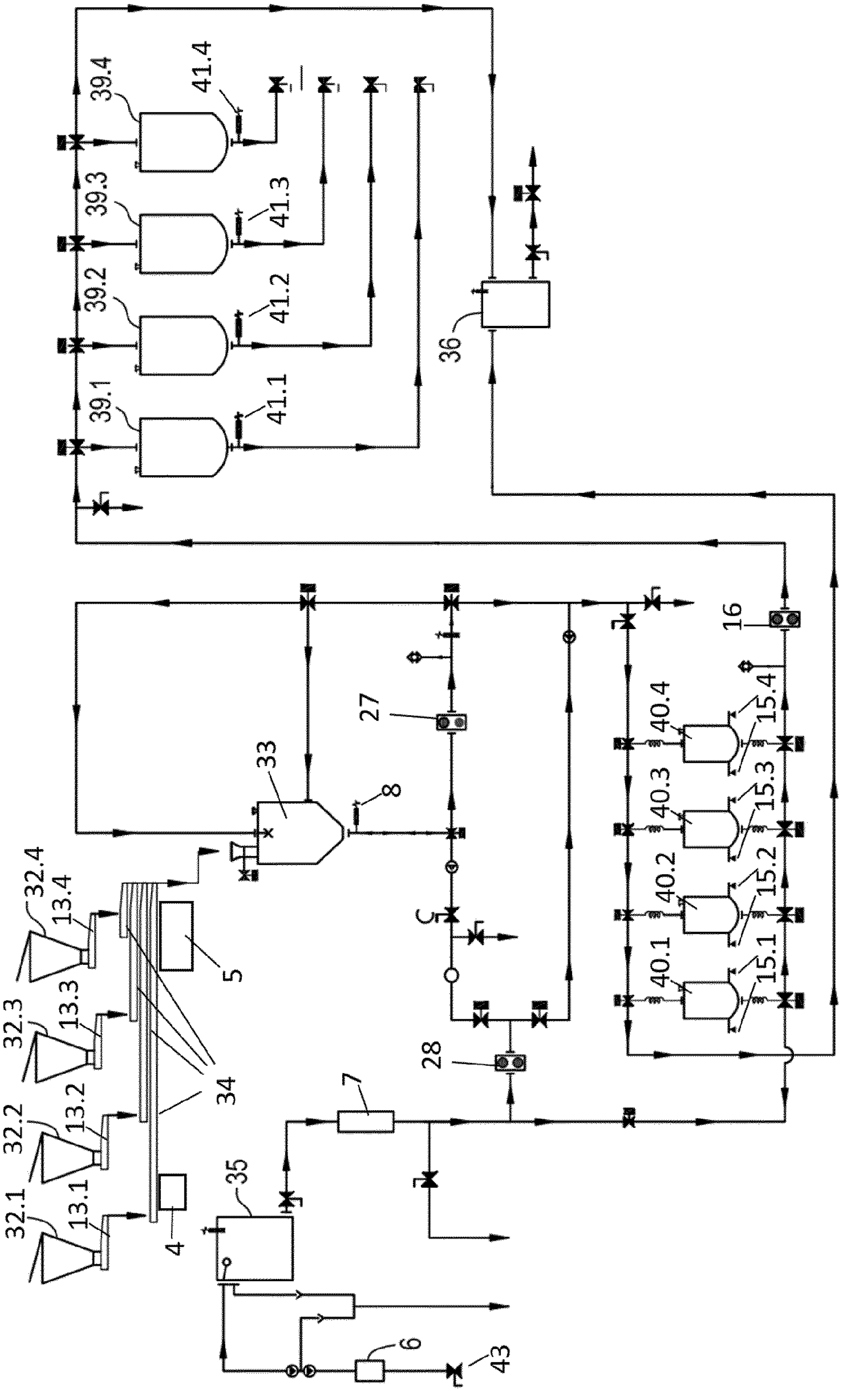
FIG. 7 is a diagrammatic representation of the apparatus of FIG. 1, which includes apparatus for dissolving powders in liquids, comprising a schematic representation of piping connections and solvent/liquid flow.

An embodiment of the present invention will now be described, by way of example only, With reference to the accompanying drawings in which:

FIG. 1 is a diagrammatic representation of a first embodiment of the apparatus according to the invention;

FIG. 2 is a detailed view of part of the apparatus of FIG. 1, which feeds particulate material from a weighting tray (34) to a mixing vessel (33), which includes a weighing tray vibrator (4) and a weighing tray Loadcell (5) arranged to discharge weighted granules into the mixing vessel (33);

FIG. 3 is a detailed view of part of the apparatus of FIG. 1, which receives liquid from a mixing vessel (33) into blending vessels (40.1-40.4), which includes Process valves (22.1-22.4) through which the liquid from the mixing vessel (33) is pumped into blending vessels (40.1-40.4) before water is be added through the mixing vessel (33) into blending vessels (40.1-40.4) to ensure all the product is removed from the mixing vessel (33) & pipework and the weight of the solution that has been transferred to the Blending Vessel is taken trough the Blending vessel Load-cells (15.1-15.4) and more water is added to reach the desired final concentration of the liquid;

FIG. 4 is a diagrammatic representation of a Programmable Logic Controller (PLC) used in the apparatus of FIG. 1, the equipment controlled by the PLC, the sensors that provide data to the PLC, and a Human Machine Interface (HMI), which allows a user to set values for process parameters;

FIG. 5 is a diagrammatic representation of a view from top down of the apparatus of FIG. 1;

FIG. 6 is a diagrammatic representation of a side view of the apparatus of FIG. 1;

FIG. 7 is a diagrammatic representation of an embodiment of the apparatus of FIG. 1, which includes a connection to an apparatus for dissolving powders in liquids;

FIG. 8 is a diagrammatic representation of a 2-Hopper-setup embodiment of the apparatus of FIG. 1, which includes a connection to an apparatus for dissolving powders in liquids and a connection to a 4-line PPLA system. Each line of the PPLA system may produce a different mixture (ratio) of two liquids (46.1 and 46.2) produced in the 2-Hopper-setup embodiment of the apparatus;

FIGS. 1 to 8 are diagrammatic representations of a first embodiment of the apparatus. The apparatus includes a frame, which is preferably mounted on dampers; Hoppers (32) for storing particulate materials, for example in the form powder and/or granules; a mixing vessel (33); a feed system for feeding particles from the Hopper (32) to the mixing vessel (33); a mixing setup; a weighing system, including a Weighing tray Loadcell (5), which is arranged to weigh particles; a control system; and a solvent supply system, comprising a Supply tank (35), arranged to supply solvent to the mixing vessel (33).

The control system includes a Programmable Logic Controller (PLC) (25) and a Human Machine Interface (HMI) (26).

The storage bin, in the form of a hopper, includes inclined lower surfaces which are arranged to direct particles to an outlet. Optionally, the hopper may be fitted with electrical Interlocked lids, that may only be unlocked via the control system, to prevent incorrect product loading. The hopper is mounted on a ramp, which in turn, sits on a on a hopper vibrator (3.1) above a vibrating weighting tray. The hopper can include at least one of a hopper high level sensor (2), to sense if the hopper is overflowing, and a hopper low level sensor (1), to sense if the hopper is empty. The hopper vibrator (3.1), hopper high level sensor (2) and hopper low level sensor (1) are connected to the PLC (25). Alternatively to a hopper high level sensor (2) and/or hopper low level sensor (1), a pressure sensor that detects presence absence of particulate material and is connected to the PLC (25) may be used. The vibrating weighting tray sits on a weighing tray Loadcell (5). The weighing tray loadcell (5) and the weighting tray vibrator (4) are connected to the PLC (25). The PLC (25) is programmed to determine the amount of particles discharged from the hopper according to the signals received from the weighing tray loadcell. The range of dosing is set by user in the HMI (26). The PLC (25) is arranged to issue an alert when it determines from the signals received form the scales that the amount of particles in the bin is outside predetermined values, for example if there is less power than a lower threshold value and/or more particles than an upper threshold value. The PLC (25) is programmed to issue an alert when it detects from the low level sensor or the pressure sensor that the amount of particles in the bin has fallen below a predetermined level. The PLC (25) is programmed to issue an alert when it detects from the high level, sensor that the amount of particles in the bin is above a predetermined level. The weighing tray loadcell has an accuracy of +/−0.5 g.

The feed system includes a first feeder which is arranged to transport particles from a hopper to the weighting tray (34) until the target weight has been achieved. The first feeder includes a ramp for transporting particles from the hopper to the weighting tray (34) and a hopper vibrator (3.1), which is arranged to vibrate the hopper and ramp to transport particles to the weighting tray (34). The hopper vibrator (3.1) preferably includes a vibrating magnet. The hopper vibrator (3.1) is controlled by the PLC (25).

Preferably, the feeder which is arranged to transport particles from a hopper to the weighting tray (34) until the target weight has been achieved includes a second hopper and a second ramp for transporting a second particulate material from the second hopper to the weighting tray (34) and a second hopper vibrator (3.2), which is arranged to vibrate the second hopper and second ramp to transport particles to the weighting tray (34). The hopper vibrator (3.2) preferably includes a vibrating magnet. The hopper vibrator (3.2) is controlled by the PLC (25).

Preferably, the feeder which is arranged to transport particles from a hopper to the weighting tray (34) until the target weight has been achieved includes a third hopper and a third ramp for transporting particles from the third hopper to the weighting tray (34) and a third hopper vibrator (3.3), which is arranged to vibrate the third hopper and third ramp to transport particles to the weighting tray (34). The hopper vibrator (3.3) preferably includes a vibrating magnet. The hopper vibrator (3.2) is controlled by the PLC (25).

Preferably, the feeder which is arranged to transport particles from a hopper to the weighting tray (34) until the target weight has been achieved includes a fourth hopper and a fourth ramp for transporting particles from the fourth hopper to the weighting tray (34) and a fourth hopper vibrator (3.4), which is arranged to vibrate the fourth hopper and fourth ramp to transport particles to the weighting tray (34). The hopper vibrator (3.4) preferably includes a vibrating magnet. The hopper vibrator (3.2) is controlled by the PLC (25).

Preferably, the feeder which is arranged to transport particles from a hopper to the weighting tray (34) until the target weight has been achieved includes an additional hopper and an additional ramp for transporting particles from the fourth hopper to the weighting tray (34) and an additional hopper vibrator, which is arranged to vibrate the additional hopper and additional ramp to transport particles to the weighting tray (34). The hopper vibrator (3.4) preferably includes a vibrating magnet. The hopper vibrator (3.2) is controlled by the PLC (25).

The feeder which is arranged to transport particles from a hopper to the weighting tray (34) may include additional hoppers and additional ramps for transporting additional types of particles from the additional hoppers to the weighting tray (34) and additional hopper vibrators, which are arranged to vibrate the additional hoppers and additional ramps to transport the additional types of particles to the weighting tray (34).

The additional particulate material, such as the second particulate material, can be fed to the mixing vessels independently of the first particulate material. For example, a first batch of liquid can be created using the first particulate material only. A second batch of liquid can be created using the second particulate material only. For other batches, both the first and second particulate materials can be fed to the mixing vessel to create a batch of liquid which includes first and second particulate material.

The PLC (25) can be programmed to adjust the rate at which particulate material is delivered to the weighting tray (34) to ensure accuracy by adjusting the speed of the weighing tray vibrator (4).

The feed system includes a second feeder, which is arranged to transport particulate material from the weighting tray (34) to the mixing vessel (33) through the powder supply valve (12). The second feeder includes a weighting tray (34) and a Weighing tray vibrator (4), which is arranged to vibrate the weighting tray (34) to transport particles to the mixing vessel (33).

The weighting tray (34) is mounted on the weighing tray loadcell (5). A first part of weighting tray (34) sits under an end of the ramp, and is arranged to receive particulate material therefrom. A second part of the weighting tray (34) overhangs the mixing vessel (33). The weighting tray (34) has an inclination. The weighting tray (34) further has rails inside, one rail per hopper and each rail is fed by one hopper.

The weighing tray loadcell (5) and the hopper vibrator (3.1) are connected to the PLC (25). The PLC (25) is able to determine from the signals received from the weighing tray loadcell (5) the mass of particulate material received from the hopper. The PLC (25) is programmed to control operation of the hopper vibrator (3.1) to deliver a target mass of particulate material to the weighting tray (34), and hence weighing tray loadcell (5). The PLC (25) compares the output reading from the weighing tray loadcell (5) with a target mass value stored in memory. When the output reading is substantially equal to the target mass value, within an acceptable tolerance, the PLC (25) determines that the target mass is achieved, and the PLC (25) switches off the hopper vibrator (3.1). The target mass value is typically set by a user via the HMI (26).

The weighing tray loadcell (5) is mounted to the frame via a damping system in order to reduce the effect of vibrations on the weighing tray loadcell (5). This helps to improve the accuracy of the weighing tray loadcell (5). If the weighing tray loadcell (5) is not providing a stable signal to the PLC (25), for example due to a high level of vibrations, the PLC (25) issues an alert.

The Weighing tray vibrator (4) is controlled by the PLC (25). The PLC (25) controls operation of the Weighing tray vibrator (4) to deliver the target mass of particles to the mixing vessel (33). The PLC (25) is programmed to adjust the rate at which particulate material is delivered to the mixing vessel (33).

Since the weighting tray (34) sits on the weighing tray loadcell (5), the PLC (25) is able to determine from the weighing tray loadcell (5) when substantially all of the particulate material has been delivered to the mixing vessel (33).

The solvent supply system includes a supply tank (35), a solvent supply valve to mixing vessel (30), which is arranged to control the flow of solvent into the mixing vessel (33), via an inlet, and a flowmeter (29), which is arranged to monitor the quantity of solvent delivered to the mixing vessel (33), a particle filter (6) to reduce impurities and UV treatment (7) reducing bacterial contamination. The supply tank (35) has a Supply Tank low level sensor (8) and a Supply Tank High level sensor (9). Alternatively to a Supply Tank low level sensor (8) and/or a Supply Tank High level sensor (9), a pressure sensor that detects presence absence of liquid and is connected to the PLC (25) may be used. The Supply Tank low level sensor (8), Supply Tank High level sensor (9), flowmeter (29), particle filter (6), UV treatment (7) and solvent supply valve to mixing vessel (30) are connected to the PLC (25). If the supply tank is connected to a main, such as a main water supply (43), water is automatically taken from the main water when a floater in the solvent supply tank opens the valve to let the solvent in until the floater in the solvent supply tank closes the valve. The PLC (25) is programmed to issue an alert when it detects from the Supply Tank low level sensor (8) or pressure sensor that the solvent level in the Supply Tank has fallen below a predetermined level. The PLC (25) is programmed to issue an alert when it detects from the Supply Tank High level sensor (9) that the amount of solvent in the Supply Tank is above a predetermined level. The solvent supply valve to mixing vessel (30) is controlled by the PLC (25). The PLC (25) is arranged to receive signals from the flow meter (29). The PLC (25) is arranged to control operation of the solvent supply valve to mixing vessel (30), in accordance with signals received from the flow meter (29), to deliver a target volume (or mass) of solvent to the mixing vessel (33). The PLC (25) compares the output reading from the flowmeter (29) with a target volume (or mass) value stored in memory. When the output reading is substantially equal to the target value, within an acceptable tolerance, the PLC (25) determines that the target volume (or mass) is achieved, and the PLC (25) closes the control valve (29). The flowmeter (29) has an accuracy of +/−100 ml. The target volume (or mass) of solvent is typically set by a user via the HMI (26).

For at least some processes, the PLC (25) is programmed to deliver at least some of the solvent to the mixing vessel (33) prior to delivering particulate material to the mixing vessel (33). The inventors have found that this reduces the possibility of some of the particles not dissolving in the water, for example due to clumping.

The mixing setup includes a mixing pump (27). The PLC (25) controls operation of the mixing setup, for example the speed and/or direction of solvent flow of the mixing pump (27).

For at least some processes, the PLC (25) can be programmed to change the direction and/or speed of rotation of the mixing pump (27). For at least some processes, the PLC (25) can be programmed to actuate the mixing pump (27) prior to delivering particulate material to the mixing vessel (33). The inventors have found that this reduces the possibility of some of the particles not dissolving in the water, for example due to clumping.

Typically, the mixing setup is operated for a set period of 'mixing time' during a batch making process. The start of the mixing period is typically taken from the time at which the PLC (25) determines that substantially all of the particulate material is delivered to the mixing vessel (33). Of course, the mixing setup is usually operating prior to commencement of the mixing period.

The mixing setup is mounted to the frame via a damping system, such as rubber shock absorbers, this reduces vibrations transmitted to the frame, which can affect operation of the loadcells (5,15).

The mixing vessel (33) is provided to mix the particulate with solvent thereby producing a liquid. The mixing vessel (33) is typically a stainless steel tank, having a slightly rounded or tapered base. The mixing vessel (33) is attached to the frame. The mixing vessel (33) is located below the weighting tray (34). The mixing vessel (33) includes a lid having an opening located below the end of the weighting tray (34) and in between the weighting tray (34) and the lid sits a Powder supply valve (12). Particulate material falls into the mixing vessel (33) via the opening. The mixing pump (27) is located within the main frame and connected to the mixing vessel (33) via piping. The Powder supply valve (12) is connected to the PLC (25).

The mixing vessel (33) includes a Mixing vessel high level sensor (11) and a Mixing vessel low level sensor (10). The sensors (10,11) are connected to the PLC (25). Alternatively to a Mixing vessel high level sensor (11) and/or a Mixing vessel low level sensor (10), a mixing vessel pressure sensor (8) that detects presence absence of liquid and is connected to the PLC (25) may be used. The PLC (25) is programmed to start operation of the mixing pump (27) in response to the Mixing vessel low level sensor (10) or pressure sensor detecting the presence of solvent. The PLC (25) is programmed to issue an alert when it detects from the Mixing vessel high level sensor (11) that the volume of solvent/liquid in the mixing vessel (33) is above a predetermined level.

A CIP valve is located at the top of the mixing vessel (33), an inlet valve is located on the side of the mixing vessel (33) and a discharge valve (22) is located at the bottom on the side of the mixing vessel (33). The PLC (25) controls operation of the discharge valve. During a mixing operation the discharge valve is open due to the necessary recirculation of solvent/liquid. When the mixing operation is completed, the PLC (25) opens the discharge valve (22.1). This enables the liquid to flow out of the mixing vessel (33).

A blending vessel (40.1) is located within the main frame on its outer edge. The blending vessel (40.1) may be located above, below or at the level of the mixing vessel (33). Preferably, the blending vessel is located at height level not above the hopper. This height arrangement of parts allows a lower machine that is ergonomically more adapted and therefore there is no need for ladders for pouring the material or reaching any part of the apparatus. The blending vessel (40.1) is connected to the discharge valve via piping. The blending vessel (40.1) adjusts the concentration of the solution by addition of extra amount of solvent. The necessary amount of solvent to reach a pre-se concentration is calculated by the PLC (25) the signal from the with Blending vessel Pressure Sensor (15). When the discharge valve is opened the liquid flows, through the piping into the blending vessel (40.1) for further dilution with solvent. The mixing pump (27) can pump the liquid from the mixing vessel (33) to the blending vessel (40.1).

The blending vessel (40) includes a Blending vessel Pressure Sensor (15) comprised in a blending vessel loadcell (42) for weighting the content of the blending vessel (40) and is connected to a Blending vessel transfer pump (16). The blending vessel loadcell (42) and Blending vessel transfer pump (16) are connected to the PLC (25). The PLC (25) is programmed to calculate from the concentration of the powder and the desired concentration and amount of final liquid, the amount of powder and solvent needed to arrive at the correct concentration. The PLC (25) is programmed to determine the content received or discharged from the blending vessel (40) according to the signals received from the blending vessel loadcell (42). The PLC (25) is arranged to issue an alert when it determines from the signals received form the blending vessel loadcell (42) that the content in the blending vessel (40) is about to exceed the capacity of the blending vessel (40).

A discharge valve is located at the base of the blending vessel. The PLC (25) controls operation of the discharge valve. A Blending vessel transfer pump (16) is provided to pump the liquid from the blending vessel to the day tank (39.1).

Optionally a day tank (39.1) is located within outside the main frame, to which an additional frame may be added on its outer edge. The blending vessel (40.1) may be located above, below or at the level of the mixing vessel (33). Preferably, the blending vessel is located at height level not above the hopper. This height arrangement of parts allows a lower machine that is ergonomically more adapted and therefore there is no need for ladders for pouring the material or reaching any part of the apparatus. The day tank (39.1) is connected to the discharge valve of the blending vessel via piping. When the discharge valve is opened, the liquid flows through the piping into the day tank (39.1) for intermediate storage. A blending vessel transfer pump (16) can be provided to pump the liquid from the blending vessel (40.1) to the day tank (39.1).

A pressure sensor (8), the mixing vessel pressure sensor (8), is provided in the in mixing vessel (33). The mixing vessel pressure sensor (8) is connected to the PLC (25). The PLC (25) is able to determine from the signals received from the mixing vessel pressure sensor (8), when no liquid is present, and hence all of the liquid has drained from the mixing vessel (33), and uses this signal to close the discharge valve (33), in readiness for the next batch.

The day tank (39.1) provides a place to store the liquid until it is transferred, for example to a dosing system for use in a pellet coating process. The day tank (39.1) is typically a stainless steel tank, having a slightly rounded or tapered base. The day tank (39.1) is attached to the frame.

The day tank (39.1) includes a day tank High level sensor (19) and a day tank low level sensor (18). The sensors (17,18) are connected to the PLC (25). Alternatively to a day tank High level sensor (19) and/or a day tank low level sensor (18), a day tank pressure sensor (40) that detects presence absence of liquid and is connected to the PLC (25) may be used. The PLC (25) may be programmed to start a new batch in response to the day tank low level sensor (18) or day tank pressure sensor (40) detecting that the liquid level in the day tank (39.1) has fallen to a predetermined low level. The PLC (25) may be programmed to dry-run a safety device in response to the day tank High level sensor (19) detecting that the liquid level in the day tank (39.1) has risen to a predetermined high level.

A discharge valve, the Day Tank valve (17), is located at the bottom of the day tank (39.1). The PLC (25) controls operation of the Day Tank valve (17). A pump can be provided to pump the liquid from the day tank (39.1) to any other connected system, such as a PPLA (44).

The apparatus includes a Clean in Place (CIP) system. The CIP system is used to rinse clean solvent through at least one of the mixing setup, including the mixing vessel (33) and piping, and the blending vessel (40.1), to clean the receptacle prior to producing a new batch of liquid. The CIP system includes a CIP valve to mixing vessel (22), a CIP valve to blending vessel (23), CIP waste tank (36), CIP waste tank high level sensor (20), CIP waste tank low level sensor (21) and uses mixing pump (27) of the mixing setup. Alternatively to a CIP waste tank high level sensor (20) and/or CIP waste tank low level sensor (21), a day tank pressure sensor (40) that detects presence absence of liquid and is connected to the PLC (25) may be used. The PLC (25) controls operation of the CIP valve to mixing vessel (22), CIP valve to blending vessel (23) and mixing pump (27), and receives signals from the flow meter (29), CIP waste tank high level sensor (20) and CIP waste tank low level sensor (21). The CIP system includes piping for each vessel to be cleaned. The PLC (25) can be programmed to clean at least one of the vessel automatically, for example according to a schedule and/or in response to an event occurring such as the end of a batch and/or a change of particulate material or in response to a sensor, such as the pressure sensor in mixing vessel showing that no liquid is left in the mixing vessel. Additionally, or alternatively, the PLC (25) can be arranged to actuate the CIP system in response to a manual request by a user. The PLC (25) can be programmed to request emptying of the CIP waste tank (36) when the PLC (25) receives a signal from the CIP waste tank high level sensor (20) that the CIP waste tank (36) is full.

The user is able to set the period of time for which the CIP system operates via the HMI (26).

During a cleaning operation the PLC (25) uses inputs from the sensors to ensure that solvent does not over flow from the tanks. Dirty solvent from the cleaning operation is directed to the CIP waste tank (36).

The PLC (25) can be arranged to operate the valves; the pumps; and the drive units automatically and/or according to user inputs to the HMI (26).

The HMI (26) includes a visual display. The display is arranged to display the following information to a user: the set quantity of the first particulate material to be delivered to the mixing vessel; the quantity of first particulate material already delivered; the current value of first particulate material from the weighing system; the set quantity of the second particulate material to be delivered to the mixing vessel; the quantity of second particulate material already delivered; the current value of second particulate material from the weighing system; the set quantity of solvent supplied to the mixing vessel; the quantity of solvent currently delivered to the mixing vessel; the set mixing time for the mixing setup; and the mixing time elapsed since commencing the mixing process.

Alerts issued by the PLC (25) can be visual and/or audible. Preferably the alert is provided by the HMI (26) via its display.

Optionally, a housing (not shown) can be provided for the apparatus. For example, a plurality of panels can be fitted to the frame to form the housing. The housing may include a door or hatch to access the apparatus. A seal can be provided around the door to ensure the interior of the housing remains dust free. Other seals can be fitted between panels, if necessary. Typically, the control system is located in an additional housing, which is attached to the frame.

It Will be appreciated that the apparatus can be retrofitted to an existing PPLA system or can be fully integrated into a new PPLA system.

In use, the liquid is typically prepared around 12 to 24 hours prior to the pellet coating process taking place.

The user inputs appropriate values into the HMI (26), thereby programming the PLC (26) With process operating values. Typically, the user selects a formula from the devices memory. If an appropriate formula is not available, the user can program the HMI (26) With a new formula.

The formula typically requires values for the following:

1. a total liquid value [litres]: the amount of solvent that is supplied to the mixing vessel for the batch;
2. a ratio value [g/litre]: the ratio of powder/to solvent that should be supplied to the mixing vessel for the batch;
3. a powder concentration [3% w/w]: concentration of powder that is supplied in the hopper;
4. a tolerance value [%]: tolerance for powder dosing; and
5. a mixing time value [seconds]: mixing time for the batch after all the solvent and powder has been supplied to the mixing vessel.

The formula may also include at least one identifier such as a formula number and/or formula name.

From the 'total liquid value' and the 'ratio value' and the 'powder concentration', the PLC (25) is able to determine a target mass of particulate material that has to be delivered to the mixing vessel (33) and a target solvent volume needed to be added partly to the mixing vessel (33) and partly to the blending vessel.

When the values have been set, the process is initiated.

The PLC (25) opens control valve and supplies solvent to the mixing vessel (33). The PLC (25) closes the control valve when it determines from signals received from the flow meter (29) that the total value of solvent is supplied to the mixing vessel (33). The solvent is added to the mixing vessel (33) at the same time as the weighing of the particles to decrease the batching process time.

The PLC (25) actuates the mixing pump (27) in response to receiving a signal from the mixing vessel low level sensor (10) or pressure sensor, which indicates that there is some solvent in the vessel (33).

The PLC (25) actuates the hopper vibrator (3.1) to dose particles to the Weighing tray Loadcell (5). In response to the PLC (25) determining from the Weighing tray Loadcell (5) that the target mass value of particles has been received by the Weighing tray Loadcell (5), the PLC (25) deactivates the hopper vibrator (3.1) and activates Weighing tray vibrator (4). When the PLC (25) receives a signal from the weighing tray Loadcell (5) that the weight is zero, all the granules have been discharged to the mixing vessel (33) the PLC (25) deactivates the hopper vibrator (3.1). When the second feeder has delivered all (within tolerance) of the particulate material to the mixing vessel (33), the mixing device mixes the solvent and particulate for a period of time equal to the Weighing tray vibrator (4).

When the mixing time has elapsed, the PLC (25) opens the discharge valve, and actuates the mixing pump (27), to transfer the liquid to the blending vessel (40.1). PLC opens the Solvent supply valve to blending vessel and the discharge valve and actuates the mixing pump (27) to transfer more solvent from the supply tank (35) through the mixing setup to the blending vessel (40.1) for further dilution with solvent until a desired final concentration of liquid is reached. The mixing pump (27) can pump the liquid from the mixing vessel (33) to the blending vessel (40.1).

Optionally, when the final liquid concentration is reached, the PLC (25) opens the discharge valve of the blending vessel (40.1), and actuates the Blending vessel transfer pump (16), to transfer the liquid from the blending vessel (40.1) to the day tank (39.1).

In a preferred embodiment of the invention, only part of the solvent is added to the mixing vessel (33) at the same time as the weighing of the particles to decrease the batching process time. After weighing of the particles, the amount of solvent needed to reach a predetermined concentration of the liquid, according to the mass of added particles as measured by the weighing tray Loadcell (5), is added to the mixing vessel (33). This has the advantage of a very high accuracy of the dilution. This system ensures precision dosing. After transfer to the blending vessel (40.1), more solvent is added to the blending vessel (40.1) through the pipework and mixing setup to clean off any residue left from the process, and so acting as a first pass clean, and diluting the liquid to the final concentration.

This will serve as a short time clean before making the next same product batch. If there was a longer period say 1 hour there would be a full CIP (Clean In Place) carried out If there was to be a change of product there would be a full CIP (Clean In Place) carried out The PLC (25) determines that the apparatus is in a state of readiness to produce another batch of liquid in response to a signal from a sensor. Of course, if a different type of liquid is required, the user can select a cleaning operation before commencing the next batch.

The liquid remains in the day tank (39.1) until it is transferred to downstream apparatus, such as enzyme dosing apparatus in a pellet coating process.

The user has the option of selecting the number of batches to be produced. If sufficient storage capacity in the form of day tanks (39.1-39-4). is available, the apparatus can produce a plurality of batches, one after the other, until all of the storage capacity is used up. The PLC (25) may use the signal from the Day Tank low level sensor (18) or day tank pressure sensor (40) in the day tank (39.1) to determine that sufficient storage capacity is available to produce a new batch.

The apparatus may include a plurality of hoppers (31.1-32.4) for storing dry particles (four hoppers (32.1-32.4) and their corresponding four vibrating feeders (13.1-13.4) are shown in FIGS. 1, 5 and 7; two hoppers and their corresponding two vibrating feeders (13.1-13.2) are shown in FIGS. 6 and 8). This enables a user to store up to four different types of particulate materials, or to have an increased capacity for one type of particles. Four hoppers and their corresponding vibrating feeders (13.1-13.4) may be, preferably, arranged on the same horizontal plane. Each hopper is arranged above its corresponding vibrating feeder. The end of each ramp is above the weighting tray. The weighting tray is located below the first feeding system and above the mixing vessel. The hopper may partly stick out of the main frame, such as for example 10 to 20 cm, to make it easier to manually fill the hopper. This also improves hygienic measures, for the main frame may be closed to avoid pollution of the apparatus, for example by keeping dust out. Another set of hoppers and their corresponding four vibrating feeders may be arranged similarly and above the first set of four hoppers.

Each of the hoppers (32.1-32.4) provided is similarly arranged to the first embodiment, for example can be mounted on a ramp, which in turn, sits on a on a hopper vibrator (3.1-3-4), which is arranged to vibrate the hopper and ramp to transport particles to the weighting tray, and/or can include at least one of a Hoper high sensor level (2) and a Hoper Low level sensor (1). Alternatively to a Hoper high sensor level (2) and/or a Hoper Low level sensor (1), a pressure sensor.

Each of the hoppers (32.1-32.4) is provided with its own first feeder which is arranged to transport particles from the hopper (32.1-32.4) to the weighting tray (34). The first feeder includes a ramp for transporting particles from the hopper (32.1-32.4) to the weighting tray (34) and a hopper vibrator (3.1-3.4), which is arranged to vibrate the hopper (32.1-32.4) and ramp to transport particles to the weighting tray (34).

More hoppers may be arranged anywhere respective to other hoppers, but all hoppers need to be above their respective vibrating feeder, which, in turn, is above the weighting tray. Preferably, all hoppers and their corresponding vibrating feeders may be, arranged on the same horizontal plane to keep the whole apparatus as low in height as possible, making it easier to fill.

The PLC (25) controls operation of the first feeders independently of each other.

For each additional hopper, a target mass value can be set or calculated to determine the mass of particulate material to be delivered to the mixing vessel (33) during a liquid manufacturing process. The PLC (25) controls operation of the first feeder for the additional hopper in a similar manner to the first feeder in the first embodiment.

Each of the vibrating feeder (13) feeds particles to the weighting tray (34) and therefore uses the same second feeder which is arranged to transport particles from the weighting tray (34) to the mixing vessel (33). Therefore, only particles from one hopper at a time may be weighed on the weighting tray (34). A weighing tray vibrator (4) is provided to vibrate the weighting tray (34) to transport particles to the mixing vessel (33). The PLC (25) controls operation of the second feeder.

The apparatus includes a plurality of blending vessels (40.1-40.4) (four blending vessels (40.1-40.4) are shown in FIG. 1). The outlet of the mixing vessel (33) is connected to each of the blending vessels (40.1-40.4) and the PLC (25) is arranged to selectively direct liquid to any of the available storage blending vessels (40.1-40.4) by controlling operation of a valve. The selection can be made automatically or in response to an input made by a user.

The apparatus includes a plurality of day tanks (39.1-39.4) (four day tanks (39.1-39.4) are shown in FIG. 1). The outlet of the blending vessels (40.1-40.4) is connected to each of the corresponding day tanks (39.1-39.4) and the PLC (25) is arranged to selectively direct liquid to any of the available day tanks (39.1-39.4) by controlling operation of a valve. The selection can be made automatically or in response to an input made by a user.

The apparatus may, optionally, include a plurality of day tank discharge pumps for transferring liquid from the day tanks (39.1-39.4) to downstream apparatus. Liquid can be transferred between the day tanks (39.1-39.4) via a pipe, using the pumps, should that be necessary. Alternatively, the day tanks (39.1-39.4) may be connected to a downstream apparatus sucking the liquid from the day tanks.

The pumps are mounted on a sub-frame, which is separate from the main frame. This is to isolate vibrations from the pumps from the main frame. The sub-frame should be secured to the floor when the apparatus is installed.

During a process for making a liquid, particulate material can be transferred to the mixing vessel (33) from any one of the hoppers, or from any combination of the available hoppers.

Although the present invention has been described in connection with specific preferred embodiments, it should be understood that the invention as claimed should not be unduly limited to such specific embodiments. Furthermore, it will be apparent to the skilled person that modifications can be made to the above embodiment that fall within the scope of the invention.

For example, other particulate materials can be used with the apparatus, this includes non-enzyme particulate materials, such as flavourings, colourings, and fragrances.

Moreover, the liquid prepared by the apparatus can be sprayed on feed which is not in the form of pellets and which can be fed, for example, immediately to the animals.

Moreover, the liquid prepared by the apparatus can be admixed to the drinking water of animals.

The number of hoppers (32.1-32.4) and associated equipment can be increased.

The number of day tanks (39.1-39.4), and associated equipment, can be increased.

The number of blending vessels (40.1-40.4), and associated equipment, can be increased.

A scanning device can be provided to open at least one hoper lid. Each hopper can be provided with a scanning device.

At least one, and preferably each, of the hoppers includes a dust filter. The dust filter is preferably located in an upper region of the hopper. The dust filter is preferably arranged to draw air into the hopper, and not outwards. The dust filter is arranged to limit the amount of dust which escapes from the hopper.

In a preferred embodiment, a drip tray/liquid retention tray (38) is at the bottom of the main frame and retains liquid after a possible spillage.

In a preferred embodiment, a dry/wet separation tray (37) keeps the powder dry by keeping liquid from spilling into powder from below. The dry/wet separation is located below the vibrating feeder (13) feeds particles to the weighting tray (34).

In a preferred embodiment, a solvent backflow CAT4 may be used to stop back flow into the main water system and may be located next to the solvent supply tank.

An air conditioning unit can be provided to condition the air within the apparatus housing.

Preferably, the air conditioning unit is located towards an upper part of the housing. The air conditioning unit is operable to keep the temperature of the atmosphere within the housing below a predetermined temperature, in particular below a temperature which is not higher than 25° C. and/or to keep the relative humidity of the atmosphere within the housing below a predetermined relative humidity, in particular below a relative humidity which is not higher than 30%.

The housing can be arranged in an airtight manner, for example by providing appropriate seals and joints. This isolates from the outside environment the equipment within the housing and the materials stored therein.

The control system, for example the PLC (25), can include a data connector, such as an Ethernet connector or a wireless data connection, to enable the PLC (25) to be controlled remotely.

The control system, for example the PLC (25), can include a report module. The report module is arranged to obtain and report process data to a user.

The housing can include a plurality of doors. For example, a first door can be provided at the front of the housing and a second door at the rear of the housing.

A connector can be provided on at least one of the hoppers, and preferably on each of the hoppers. The or each connector is preferably provided at an upper part, for example the top, of the hopper. The connector is arranged to receive a recipient, such as a container. The connector enables the container to be attached to the hopper. The purpose of the connector is to enable the container to be emptied without making any dust, or a minimal amount of dust.

The liquids produced by the apparatus and/or process of the present invention may be used in a Post Pelleting Liquid Application system. For example the apparatus as disclosed in the present invention may be used to dissolve or suspend water soluble granulates of enzymes and apply them to a certain concentration in feed. When required for a pellet coating process, a blending vessel, or optionally a day tank, comprising the liquid may be connected to a supply line. The liquid enzyme is supplied to the pellet coating device by another pump during a pellet coating process.

The preferred embodiment of the apparatus of the present invention may be unique and custom built and therefore offers the highest flexibility: The apparatus of the present invention is a fully sealed system. It is dust tight and leak free. Furthermore, it offers easy and secure access to load product and is fully connectable to existing dosing equipment. It offers full CIP cleaning rather than rinse only and therefore eliminates the risk of microbial contamination and cross contamination. A setup with 4 hoppers allows for maximum flexibility in making different batches of liquids and may be easily upgraded to more hoppers if more powders are to be used. The preferred embodiment of the apparatus of the present invention is robust to vibration and simple to clean and maintain.

The preferred embodiment of the apparatus of the present invention may have outside dimensions of 1600 mm (D)+750 mm platform×2000 mm (W)×1700 mm (H) Without Day Tank extension and/or 1600 mm (D)+750 mm with platform×2400 mm (W)×1700 mm (H) With Day Tank extension, with a loading capacity for each hopper of up to 10 kg particulate material, a solvent supply tank of up to 60 L and a CIP waste Tank capacity of up to 60 L.

The apparatus of the present invention may further be used as a system to apply other liquids at any other step of the feed manufacturing.

The apparatus for manufacturing at least one liquid according to the invention may be connected to system for coating pellets, such as feed pellets. The system for coating pellets may include: the apparatus for manufacturing at least one liquid; a pellet source; a pellet coating device; means for feeding at least one liquid from the manufacturing apparatus to the pellet coating device; wherein the pellet coating device is arranged to apply the or each liquid to at least some of the pellets received from the pellet source.

In another embodiment the apparatus may be arranged for inclusion in a pellet coating system to supply the liquid to downstream apparatus such as a pellet coating station.

In a preferred embodiment of the invention, the at least one liquid manufactured by the, apparatus of the present invention is a liquid enzyme formulation. This liquid enzyme formulation is prepared on site. Thus the liquid enzyme is always fresh as it is typically used within 12-24 hours after preparation. It gives the nutritionist more accuracy and flexibility while dosing the enzyme in the feed or in drinking water.

The accuracy of dosing the required amount of powder is below a dosing error of 1 g, preferably below 0.75 g, more preferably below 0.5 g.

The accuracy of dosing the required amount of liquid is below a dosing error of 200 mL, preferably below 150 mL, more preferably below 100 mL.

Embodiments of the invention can be summarized as follows:

1. An embodiment of an apparatus for dissolving and/or suspending powders in liquids may comprise:
   - a) a mixing system for dissolving or suspending substances located in a mixing vessel in a solvent,
   - b) solvent supply means to supply solvent to the mixing system,
   - c) a feeding system for feeding a particulate material to the weighing system,
   - d) a weighing system for weighting powders,
   - e) a blending vessel to which material is transferred from the mixing system,
   - f) optionally, a day tank (39) to which a material may be transferred from the blending vessel for storage, and
   - g) and a control system to control operation of at least part of the feed system. characterized in that
   - h) the mixing system is a recirculation system, comprising a mixing pump (27) and a mixing vessel (33), and i) the feeding system comprises at least one vibrating feeder (13), comprising a Hopper (32), a first chute and a hopper vibrator (3).

2. An embodiment of the Apparatus may include a solvent supply means which comprises a supply tank (37) and a pump.
3. An embodiment of the Apparatus may include a feeding system which comprises at least one, preferably at least two, preferably at least three, preferably at least four, vibrating feeder (13), comprising a Hopper (32), a first chute and a hopper vibrator (3).
4. An embodiment of the Apparatus may include a weighing system which comprises a weighing tray (34), a weighing tray loadcell (5) and a weighing tray vibrator (4).
5. An embodiment of the Apparatus may include a control system which comprises a Programmable Logic Controller (PLC) (25) and a Human Machine Interface (HMI).
6. An embodiment of the Apparatus may include a control system which is arranged to receive signals from the weighing system and to control operation of at least part of the feed system.
7. An embodiment of the Apparatus may include a feed system which is arranged to feed particulate material to the weighing system, and to feed particulate material from the weighing system to the mixing vessel.
8. An embodiment of the Apparatus may include a control system which is arranged to cease feeding particulate material to the weighing system, in response to the control system determining from the signals received from the weighing system that the target mass of particulate material has been fed to the weighing system.
9. An embodiment of the Apparatus may include a feed system which includes a first feeder arranged to feed particulate material from the hopper to the weighing system and the control system is arranged to control operation of the first feeder according to signals received from weighing system.
10. An embodiment of the Apparatus may include a feed system which includes a second feeder arranged to feed particulate material from the weighing system to the mixing vessel.
11. An embodiment of the Apparatus may include a control system which is arranged to control operation of the second feeder according to signals received from weighing system.
12. An embodiment of the Apparatus may include a control system which is arranged to actuate the second feeder in response to the control system determining from the signals received from the weighing system that the target mass of particulate material has been fed to the weighing system.
13. An embodiment of the Apparatus may include a feed system is arranged to feed at least a second, preferably a second and a third, preferably a second and a third and fourth, particulate material from at least a second, preferably a second and a third, preferably a second and a third and fourth, vibrating feeder (13), comprising a Hopper, a first chute and a hopper vibrator to the weighing system.
14. An embodiment of the Apparatus may include a control system which is arranged to cease feeding second, preferably the second and a third, preferably second and third and fourth, particulate material to the weighing system in response to the control system determining from the signals received from the weighing system that the target mass of second, preferably the second and a third, preferably second and third and fourth, particulate material has been fed to the weighing system.
15. An embodiment of the Apparatus may include a control system which is arranged to adjust the rate at which the or each first feeder dispenses particulate material to the weighing system.
16. An embodiment of the Apparatus may include a control system which includes a user input device and memory, which enables a user to specify at least one of: the quantity of the first particulate material to be delivered to the mixing vessel; the quantity of the second particulate material to be delivered to the mixing vessel; the quantity of solvent supplied to the mixing vessel; and the mixing time for the mixing setup.
17. An embodiment of the Apparatus may include a control system includes a display device, which is arranged to display at least one of the following: the set quantity of the first particulate material to be delivered to the mixing vessel; the quantity of first particulate material already delivered; the current value of first particulate material from the weighing system; the set quantity of the second particulate material to be delivered to the mixing vessel; the quantity of second particulate material already delivered; the current value of second particulate material from the weighing system; the set quantity of solvent supplied to the mixing vessel; the quantity of solvent currently delivered to the mixing vessel; the set mixing time for the mixing setup; and the mixing time elapsed since commencing the mixing process.
18. An embodiment of the Apparatus may include a solvent supply means includes at least one flowmeter, and the control system is arranged to control the quantity of solvent supplied to the mixing vessel according to signals received from the at least one flowmeter.
19. An embodiment of the Apparatus may include a solvent supply means includes at least one valve, and the control system is arranged to control operation of at least one valve according to signals received from the flowmeter.
20. An embodiment of the Apparatus may include a mixing vessel which includes a first sensor, and the control system is arranged to actuate the mixing setup when the first sensor detects the presence of solvent in the mixing vessel.
21. An embodiment of the Apparatus may include a mixing vessel which includes a second sensor, which is arranged as an overfill safety sensor, and the control system is arranged to cease supplying solvent to the mixing vessel in response to the second sensor detecting solvent.
22. An embodiment of the Apparatus may include a control system which is arranged to supply at least some solvent to the mixing vessel prior to delivering particulate material to the mixing vessel.
23. An embodiment of the Apparatus may include a control system which controls operation of the mixing device.
24. An embodiment of the Apparatus may include a control system which includes a timer and operates the or each mixing setup for a set period of time when producing a batch of liquid.

25. An embodiment of the Apparatus may include a mixing device which is mounted to a frame by damping means.
26. An embodiment of the Apparatus may include a control system which is arranged to actuate the mixing setup prior to delivering particulate material to the mixing vessel.
27. An embodiment of the Apparatus may include a mixing vessel which includes a discharge valve for discharging liquid from the mixing vessel, and the control system is arranged to control operation of the discharge valve.
28. An embodiment of the Apparatus may include a control system which is arranged to automatically open the or each discharge valve at the end of a mixing process.
29. An embodiment of the Apparatus may include at least one blend vessel, which is connected in series with the mixing vessel discharge valve, and is arranged for diluting liquid produced in the mixing vessel.
30. An embodiment of the Apparatus may include at least one day tank, which is connected in series with at least one blend vessel discharge valve, and is arranged for storing liquid produced in at least one blend vessel.
31. An embodiment of the Apparatus may be provided wherein the or each day tank includes a low liquid level sensor located towards its base, and the control system is arranged to determine from the signals received from the sensor that a low liquid level condition has occurred.
32. An embodiment of the Apparatus may include at least one pump arranged to pump liquid from the mixing vessel.
33. An embodiment of the Apparatus may be provided wherein the or each weighing system is mounted to a frame by a damping arrangement.
34. An embodiment of the Apparatus may include a cleaning system arranged to clean at least one of the mixing vessel and blend vessel with solvent from the solvent supply system, wherein the control system is arranged to control operation of the cleaning system.
35. An embodiment of the Apparatus may be provided wherein the user interface is arranged to enable a user to specify the period of time for which the cleaning system operates.
36. An embodiment of the Apparatus may include a main frame arranged to support, either directly or indirectly, at least some, and preferably each, of the following equipment: the mixing vessel; the or each vibrating feeder (13); the weighing system; the or each blend vessel; and the or each mixing setup; and optionally the or each day tank.
37. An embodiment of the Apparatus may be provided wherein the first particulate material is water soluble.
38. An embodiment of the Apparatus may be provided wherein the first particulate material includes at least one enzyme.
39. An embodiment of the Apparatus may include a second particulate material.
40. An embodiment of the Apparatus may be provided wherein the second particulate material is water soluble.
41. An embodiment of the Apparatus may be provided wherein the second particulate material includes at least one enzyme.
42. An embodiment of the Apparatus may be provided wherein the apparatus is arranged for inclusion in a pellet coating system to supply the liquid to downstream apparatus, such as a pellet coating station.
43. An embodiment of the Apparatus may include at least one pump arranged to pump liquid from the day tank to said pellet coating device.
44. An embodiment of a method of making a liquid formulation may be provided which comprises suspending or dissolving a powder in a liquid, comprising the use of an embodiment of the apparatus as described previously which includes: providing a first hopper; storing a first particulate material, preferably an enzyme, in the first hopper; providing a mixing vessel; supplying solvent to the mixing vessel; providing a mixing setup for mixing through recirculation; actuating the mixing setup to mix substances in the mixing vessel; providing a feed system and a weighing system; the feed system feeding first particulate material to the weighing system; the weighing system determining the mass of first particulate material fed thereto; a control system receiving signals from the weighing system and controlling operation of at least part of the feed system, according to the signals received from the weighing system, to control the mass of first particulate material fed to the weighing system; and feeding the first particulate material from the weighing system to the mixing vessel.
45. An embodiment of the method may include providing a hopper vessel and storing a second particulate material in the hopper.
46. An embodiment of the method may be provided wherein the second particulate material includes at least one enzyme.
47. An embodiment of the method may be provided wherein at least one of the first and second particulate materials is water soluble.
48. An embodiment of the method may be provided wherein the feed system includes a second vibrating feeder, and feeding second particulate material to the weighing system by means of the Second vibrating feeder.
49. An embodiment of the method may include a control system ceasing feeding second particulate material to the weighing system in response to determining from signals received from the weighing system that a target mass of second particulate material is received by the weighing system.
50. An embodiment of the method may include a control system which includes a user input device and memory.
51. An embodiment of the method may include a user specifying at least one of the following to create a batch of liquid: the quantity of the first particulate material to be delivered to the mixing vessel; the quantity of the second particulate material to be delivered to the mixing vessel; the quantity of solvent supplied to the mixing vessel; and the mixing time for mixing setup.
52. An embodiment of the method may include a solvent supply means which includes at least one flowmeter, and the control system controlling the quantity of solvent supplied to the mixing vessel according to signals received from the at least one flowmeter.
53. An embodiment of the method may include a solvent supply means which includes at least one valve, and the control system controlling operation of at least one valve according to signals received from the flowmeter.
54. An embodiment of the method may include a mixing vessel which includes a first sensor, and the control system actuating the mixing device in response to the first sensor detecting the presence of liquid in the mixing vessel.

55. An embodiment of the method may include a control system supplying at least some solvent to the or each mixing vessel prior to delivering particulate material to the mixing vessel.

56. An embodiment of the method may include a control system which includes a timer, and the control system operating the or each mixing device for a set period of time.

57. An embodiment of the method may include a control system actuating the mixing setup prior to delivering particulate material to the mixing vessel.

58. An embodiment of the method may include a mixing vessel which includes a discharge valve; and the control system automatically opening the discharge valve at the end of the mixing process to discharge liquid from the or each mixing vessel.

59. An embodiment of the method may include providing at least one blending vessel for diluting liquid produced in the mixing vessel, wherein the or each blending vessel includes a liquid level sensor located towards its base.

60. An embodiment of the method may include providing at least one day tank for storing liquid produced in the at least one blending vessel, wherein the or each day tank includes a liquid level sensor located towards its base.

61. An embodiment of the method may include a control system manufacturing a new batch of liquid in response to signals received from the liquid level sensor.

62. An embodiment of the method may include providing at least one pump, and pumping liquid from the mixing vessel.

63. An embodiment of the method may include providing at least one pump and pumping liquid from the at least one day tank to pellet coating apparatus.

64. An embodiment of the method may include vibrating feeder(s) having a vibration drive unit, and feeding particulate material to the weighing system by actuating the vibration drive unit.

65. An embodiment of the method may include a weighing setup having a vibration drive unit, and feeding particulate material to the mixing vessel by actuating the vibration drive unit.

66. An embodiment of the method may include providing a cleaning system arranged to clean at least one of: the mixing vessel and the storage vessel(s).

67. An embodiment of the method may include specifying a period of time for which the cleaning system operates.

68. An embodiment of the method may include providing at least one day tank as intermediate storage vessel between the manufacturing apparatus and the pellet coating device, and storing the liquid enzyme in the intermediate storage vessel.

69. An embodiment of the method may be provided wherein the manufacturing apparatus is provided in the form of a standalone unit, and retro-fitting an existing pellet manufacturing system with the apparatus.

Definitions

Feed: The term "Feed" or "feed composition" refers to any compound, preparation, or mixture suitable for, or intended for intake by animals, preferably farm animals. Feed refers to a manufactured or artificial diet (i.e., formulated feed) to supplement or to replace natural feed, which is most commonly produced in form of flakes or pellets, for example extruded pellets.

The term "powder" or "particulate material" is intended to mean a substantially dry solid at room temperature and at atmospheric pressure, milled or otherwise formed to a state of small loosely bound particles and/or granules, where the individual particles are preferably characterized by a maximum particle size of at most 1 mm at 23° C. and at atmospheric pressure; A particle is defined as a small object that behaves as an integral unit in terms of its transportation and properties. Particles according to the present invention include, but are not limited to enzymes, probiotics, colorants, aroma ingredients, flavors, fragrances, other micro-components. The powders according to the present invention must be soluble or be able to be suspended without precipitations in a solvent. The particulate material may include at least one enzyme. For example, the particulate material can include xylanases, phytases, glucanases. Other particulate materials can be used.

The term "liquid" in the context of the present invention refers to a mixture consisting of at least one powder and at least one solvent to form a solution, suspension, emulsion and the like. The liquid may be of uniform composition.

The term "solvent" is intended to mean a compound or a composition comprising one or more solvents that is liquid at room temperature. By room temperature it means about 20° C. These solvents can be amphipathic (also known as amphipathic or slightly nonpolar), hydrophilic, or hydrophobic (also known as lipophilic). In some embodiments, these solvents are water or water miscible and in others, they are immiscible in water. Non-limiting example of solvents that may be used to practice the methods of the instant invention include methanol, ethanol, isopropanol, acetone, ethyl acetate, and acetonitrile, alkanes (hexane, pentane, heptane, octane), esters (ethyl acetate, butyl acetate), ketones (methyl ethyl ketone (MEK), methyl isobutyl ketone (MIBK)), aromatics (toluene, benzene, cyclohexane, tetrahydrofuran), haloalkanes (chloroform, trichloroethylene), ethers (diethyl ether), and mixtures (diesel, jet fuel, gasoline). The solvent may further be a fat or an oil.

The invention claimed is:

1. An apparatus for dissolving and/or suspending a powder material in a liquid solvent comprising:

a mixing vessel;

a recirculation mixing system comprising the mixing vessel, circulation piping attached to the mixing vessel and a mixing pump configured to recirculate liquid solvent to the mixing vessel through the circulation piping;

a liquid solvent supply tank to store a supply of the liquid solvent and a liquid solvent pump to discharge the liquid solvent from the liquid solvent supply tank to the mixing vessel;

a weighing system positioned on a feed path between the hopper and the mixing vessel, the weighing system comprising:

(i) a weighing tray, (ii) a weighing tray loadcell, and (iii) a weighing tray vibrator configured to transport the powder material from the weighing tray to the mixing vessel;

a feeding system comprising:

(i) a hopper configured to store the powder material; and (ii) at least one vibrating feeder which includes a ramp and a hopper vibrator configured to transport the powder material from the hopper to the weighing system;

a control system including a programmable logic controller (PLC) and a human machine interface (HMI), wherein the PLC:

(a) receives signals from the weighing tray loadcell and controls operation of the hopper vibrator to deliver a target mass of powder material to the weighing tray and actuates the weighing tray vibrator after the target mass has been achieved;

(b) actuates the solvent supply pump to supply the liquid solvent from the liquid solvent supply tank to the mixing vessel before the powder material is delivered; and (c) following supply of the liquid solvent to the mixing vessel, actuates the mixing pump before the powder material is delivered to create turbulence in the liquid solvent.

2. The apparatus according to claim 1, wherein the mixing vessel includes a lower liquid solvent sensor, and wherein the PLC actuates mixing within the mixing vessel upon liquid solvent detection by the lower liquid solvent sensor.

3. The apparatus according to claim 1, wherein the mixing vessel includes a discharge valve controlled by the PLC.

4. The apparatus according to claim 3, wherein the mixing vessel is connected in series to the discharge valve.

5. The apparatus according to claim 1, further comprising a clean-in-place (CIP) system controlled by the PLC.

6. The apparatus according to claim 1, wherein the weighing system includes dampers for mounting the weighing system to reduce vibrations thereof.

7. The apparatus according to claim 1, wherein the apparatus further comprises a main frame which supports the mixing vessel, the feeding system, the weighing system and the mixing vessel.

8. The apparatus according to claim 1, wherein the apparatus is a component part of a pellet coating system.

9. The apparatus according to claim 1, wherein the apparatus further comprises a day tank which is connected downstream.

10. The apparatus according to claim 1, wherein the feeding system includes multiple vibrating feeders that are arranged on a common plane.

11. A method of making a liquid formulation comprising suspending or dissolving a powder material in a liquid solvent, the method comprising the steps of:

(a) providing the apparatus according to claim 1;

(b) initially supplying the liquid solvent from a source thereof to the mixing vessel prior to supplying the powder material to the mixing vessel;

(c) actuating recirculation of the liquid solvent to the mixing vessel before addition of the powder material;

(d) weighing the powder material to obtain a target mass of the powder material; and (e) after the target mass of the powder material is obtained, actuating the feeding system to feed the target mass of the powder material to the mixing vessel.

* * * * *